(12) United States Patent
Sajassi

(10) Patent No.: US 10,666,459 B1
(45) Date of Patent: May 26, 2020

(54) SYSTEM AND METHOD TO FACILITATE INTEROPERABILITY BETWEEN VIRTUAL PRIVATE LAN SERVICE (VPLS) AND ETHERNET VIRTUAL PRIVATE NETWORK (EVPN) WITH ALL-ACTIVE MULTI-HOMING

(71) Applicant: CISCO TECHNOLOGY, INC., San Jose, CA (US)

(72) Inventor: Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 72 days.

(21) Appl. No.: 15/642,126

(22) Filed: Jul. 5, 2017

Related U.S. Application Data

(60) Provisional application No. 62/483,136, filed on Apr. 7, 2017.

(51) Int. Cl.
  *H04L 12/46* (2006.01)
  *H04L 12/721* (2013.01)
  *H04L 12/723* (2013.01)

(52) U.S. Cl.
  CPC .......... *H04L 12/4641* (2013.01); *H04L 45/50* (2013.01); *H04L 45/72* (2013.01)

(58) Field of Classification Search
  CPC . H04L 12/4633; H04L 12/4641; H04L 45/28; H04L 45/50; H04L 45/60;
  (Continued)

(56) References Cited

U.S. PATENT DOCUMENTS 7,558,219 B1 * 7/2009 Aggarwal ............... H04L 12/18
                                                                  370/256
8,130,775 B2 * 3/2012 Jounay ..................... H04L 45/22
                                                                  370/401
(Continued)

FOREIGN PATENT DOCUMENTS

CN  103348636 A  * 10/2013 ............. H04L 45/16
CN  105939257 A  *  9/2016 ......... H04L 12/4641
(Continued)

OTHER PUBLICATIONS

Rosen, E., et al., "Multiprotocol Label Switching Architecture," Network Working Group, RFC 3031, Jan. 2001, 61 pages; http://citeseerx.ist.psu.edu/viewdoc/download;jsessionid=79F0F180EA593855E9F12FD4D6C1B245?doi=10.1.1.382.9325&rep=rep1&type=pdf.

(Continued)

*Primary Examiner* — Eric Nowlin

(57) ABSTRACT

A method is provided in one example embodiment and may include receiving a frame at a Ethernet Virtual Private Network (EVPN) provider edge (PE) node via an attachment circuit link, wherein the frame is to be forwarded to a Virtual Private Local Area Network (LAN) Service (VPLS) PE node; determining whether the EVPN PE node is a designated forwarder for the attachment circuit link; forwarding the frame using at least one primary pseudowire label based on a determination that the EVPN PE node is the designated forwarder for the attachment circuit link; and forwarding the frame using at least one mirrored pseudowire label based on a determination that the EVPN PE node is not the designated forwarder for the attachment circuit link. The EVPN node can be in an all-active multi-homed configuration with at least one other EVPN PE node for a customer edge device.

20 Claims, 6 Drawing Sheets

(58) Field of Classification Search
CPC ..... H04L 45/68; H04L 45/72; H04L 63/0272; H04L 69/22

See application file for complete search history.

(56) References Cited

U.S. PATENT DOCUMENTS

| | | | | |
|---|---|---|---|---|
| 8,320,389 | B2 * | 11/2012 | Zhang | H04L 45/00 370/401 |
| 8,331,220 | B2 * | 12/2012 | Kitada | H04L 45/00 370/217 |
| 8,665,883 | B2 * | 3/2014 | Balus | H04L 12/4641 370/395.53 |
| 8,780,699 | B1 * | 7/2014 | Hasan | H04L 1/22 370/219 |
| 8,948,169 | B2 | 2/2015 | Salam et al. | |
| 8,953,590 | B1 | 2/2015 | Aggarwal et al. | |
| 8,988,984 | B2 * | 3/2015 | Marques | H04L 45/28 370/219 |
| 9,019,814 | B1 * | 4/2015 | Mohanty | H04L 45/00 370/219 |
| 9,143,396 | B2 * | 9/2015 | Dong | H04L 12/4641 |
| 9,148,290 | B2 | 9/2015 | Salam et al. | |
| 9,178,816 | B1 | 11/2015 | Ojha et al. | |
| 9,379,945 | B2 * | 6/2016 | Janardhanan | H04L 45/48 |
| 9,509,609 | B2 * | 11/2016 | Ye | H04L 12/462 |
| 9,628,375 | B2 * | 4/2017 | Pathangi Narasimhan | H04L 45/48 |
| 9,853,915 | B2 * | 12/2017 | Ranns | H04L 45/28 |
| 9,929,940 | B2 * | 3/2018 | Singh | H04L 12/4641 |
| 10,243,841 | B2 * | 3/2019 | Gupta | H04L 45/28 |
| 10,305,818 | B2 * | 5/2019 | Ranns | H04L 47/825 |
| 2006/0182113 | A1 * | 8/2006 | Liang | H04L 12/4604 370/395.3 |
| 2009/0296568 | A1 * | 12/2009 | Kitada | H04L 45/00 370/221 |
| 2010/0098094 | A1 * | 4/2010 | Jounay | H04L 45/10 370/401 |
| 2012/0201124 | A1 * | 8/2012 | Marques | H04L 45/04 370/221 |
| 2012/0219004 | A1 * | 8/2012 | Balus | H04L 12/4641 370/395.53 |
| 2013/0235879 | A1 | 9/2013 | Sajassi et al. | |
| 2013/0294448 | A1 * | 11/2013 | Mentze | H04L 45/16 370/390 |
| 2014/0022890 | A1 * | 1/2014 | Dong | H04L 12/4641 370/219 |
| 2015/0146727 | A1 * | 5/2015 | Ye | H04L 12/462 370/392 |
| 2015/0256405 | A1 * | 9/2015 | Janardhanan | H04L 45/48 370/255 |
| 2016/0234100 | A1 * | 8/2016 | Pathangi Narasimhan | H04L 45/48 |
| 2016/0261487 | A1 * | 9/2016 | Singh | H04L 12/4641 |
| 2016/0277210 | A1 | 9/2016 | Lin et al. | |
| 2017/0026233 | A1 | 1/2017 | Boutros et al. | |
| 2017/0126587 | A1 * | 5/2017 | Ranns | H04L 45/28 |
| 2017/0288948 | A1 * | 10/2017 | Singh | H04L 41/0659 |
| 2017/0353382 | A1 * | 12/2017 | Gupta | H04L 45/28 |
| 2018/0069805 | A1 * | 3/2018 | Ranns | H04L 45/28 |
| 2018/0287946 | A1 * | 10/2018 | Nagarajan | H04L 47/15 |
| 2019/0280988 | A1 * | 9/2019 | Ranns | H04L 47/825 |

FOREIGN PATENT DOCUMENTS

| | | | | |
|---|---|---|---|---|
| CN | 107276784 | A | * 10/2017 | ......... H04L 41/0659 |
| CN | 108259291 | A | * 7/2018 | ......... H04L 12/4641 |
| CN | 105939257 | B | * 4/2019 | ......... H04L 12/4641 |
| EP | 2127270 | A2 | * 12/2009 | ......... H04L 45/10 |
| EP | 3065342 | A1 | * 9/2016 | ......... H04L 12/4641 |
| EP | 3229408 | A1 | * 10/2017 | ......... H04L 41/0659 |
| EP | 3065342 | B1 | * 11/2017 | ......... H04L 12/4641 |
| WO | WO-2012105936 | A1 | * 8/2012 | ......... H04L 45/16 |
| WO | WO-2017219859 | A1 | * 12/2017 | ......... H04L 12/18 |

OTHER PUBLICATIONS

Awduche, D., et al., "RSVP-TE: Extensions to RSVP for LSP Tunnels," Network Working Group, RFC 3209, Dec. 2001, 61 pages https://www.rfc-editor.org/rfc/pdfrfc/rfc3209.txt.pdf.

Rekhter, Y., et al., "A Border Gateway Protocol 4 (BGP-4)," Network Working Group, RFC 4271, Jan. 2006, 104 pages; https://www.rfc-editor.org/rfc/pdfrfc/rfc4271.txt.pdf.

Anderson, L., et al., "Framework for Layer 2 Virtual Private Networks (L2VPNs)," Network Working Group, RFC 4664, Sep. 2006, 44 pages; https://www.rfc-editor.org/rfc/pdfrfc/rfc4664.txt.pdf.

Augustyn, W., et al., "Service Requirements for Layer 2 Provider-Provisioned Virtual Private Networks," Network Working Group, RFC 4665, Sep. 2006, 32 pages; https://tools.ietf.org/pdf/rfc4665.pdf.

Kompella, K., et al., "Virtual Private Lan Service (VPLS) Using BGP for Auto-Discovery and Signaling," Network Working Group, RFC 4761, Jan. 2007, 28 pages; https://tools.ietf.org/pdf/rfc4761.pdf.

Lasserre, M., et al., "Virtual Private LAN Service (VPLS) Using Label Distribution Protocol (LDP) Signaling," Network Working Group, RFC 4761, Jan. 2007, 31 pages; https://tools.ietf.org/pdf/rfc4762.pdf.

Anderson, L., et al., "Multiprotocol Label Switching (MPLS) Label Stack Entry: "EXP" Field Renamed to "Traffic Class" Field," Network Working Group, RFC 5462, Feb. 2009, 9 pages; https://www.rfc-editor.org/rfc/pdfrfc/rfc5462.txt.pdf.

Sajassi, A., et al., "BGP MPLS-Based Ethernet VPN," Internet Engineering Task Force (IETF), RFC 7432, Feb. 2015, 56 pages; https://tools.ietf.org/pdf/rfc7432.pdf.

Cisco Systems, Inc., "Cisco MWR 2941 Mobile Wireless Edge Router Software Configuration Guide, Release 15.0(1)MR, Chapter 22 Configuring Pseudowire," Text Part Number: OL-23889-01, Mar. 2011, 44 pages; http://www.cisco.com/c/en/us/td/docs/wireless/mwr_2941_dc/software_config/guide/3_3/2941_33_Config_Guide.pdf.

Cisco Systems, Inc., "Ethernet VPN (EVPN) and Provider Backbone Bridging—EVPN: Next Generation Solutions for MPLS-based Ethernet Services—Introduction and Application Note," White Paper, May 2014, 10 pages; http://www.cisco.com/c/en/us/products/collateral/routers/asr-9000-series-aggregation-services-routers/whitepaper_c11-731864.pdf.

Juniper Networks, "EVPN Multihoming Overview," TechLibrary, retrieved and printed Apr. 6, 2017, 21 pages; https://www.juniper.net/documentation/en_US/junos/topics/concept/evpn-bgp-multihoming-overview.html.

Google, "Hierarchical VPLS—Knowledge Base," retrieved and printed Apr. 6, 2017, 17 pages; https://sites.google.com/site/amitsciscozone/home/vpls/hierarchical-vpls.

Cisco Systems, Inc., "Cisco Prime Fulfillment Theory of Operations Guide 6.2, Chapter 1 Layer 2 VPN Concepts," Copyright © 2012, Text Part No. OL-24387-01, 22 pages; http://www.cisco.com/c/en/us/td/docs/net_mgmt/prime/fulfillment/6-2/theory/operations/guide/theory.pdf.

Cisco Systems, Inc., "Link Aggregation Control Protocol (LACP) (802.3ad) for Gigabit Interfaces" First Published Nov. 2006, Revised: Mar. 2007, 18 pages; http://www.cisco.com/c/en/us/td/docs/ios/12_2sb/feature/guide/gigeth.pdf.

Cisco Systems, Inc., "MPLS Label Distribution Protocol (LDP)," Copyright © 2005, 32 pages; http://www.cisco.com/c/en/us/td/docs/ios/12_4t/12_4t2/ftldp41.html.

Brian McGahan, Ine, "MPLS Tunnels Explained," retrieved and printed May 11, 2017, 12 pages; http://blog.ine.com/2010/08/26/mpls-tunnels-explained/.

Wikipedia, "Multihoming," retrieved and printed Apr. 6, 2017, 5 pages; https://en.wikipedia.org/wiki/Multihoming.

Wikipedia, "Multiprotocol Label Switching," retrieved and printed May 11, 2017, 6 pages; https://en.wikipedia.org/wiki/Multiprotocol_Label_Switching.

(56) References Cited

OTHER PUBLICATIONS

Sajassi, Ali, et al., (PBB-) EVPN Seamless Integration with (PBB-) VPLS, Feb. 20, 2015, 10 pages; https://tools.ietf.org/pdf/draft-ietf-bess-evpn-vpls-seamless-integ-00.pdf.

Sajassi, Ali, et al., (PBB-) EVPN Seamless Integration with (PBB-) VPLS, Apr. 27, 2015, 10 pages; https://www.ietf.org/archive/id/draft-sajassi-bess-evpn-vpls-seamless-integ-00.txt.

Cisco Systems, Inc., "IEEE 802.1ah on Provider Backbone Bridges," Carrier Ethernet Configuration Guide, Cisco IOS Release 15S, retrieved and printed May 11, 2017, 24 pages.

Cisco Systems, Inc., "Virtual Private LAN Service on Cisco Catalyst 6500/6800 Supervisor Engine 2T," Copyright © 2013, 12 pages; http://docplayer.net/4709902-Virtual-private-lan-service-on-cisco-catalyst-6500-6800-supervisor-engine-2t.html.

Cisco Systems, Inc., "Chapter 38: Virtual Private LAN Services (VPLS)," Cisco IOS Software Configuration Guide, Release 15.0SY, retrieved and printed May 11, 2017, 20 pages; http://www.cisco.com/c/en/us/td/docs/switches/lan/catalyst6500/ios/15-0SY/configuration/guide/15_0_sy_swcg/vpls.pdf.

Cisco Systems, Inc., "VPLS and VPWS—At-A-Glance," Copyright © 2004, retrieved and printed May 11, 2017, 1 page.

Davis, David, "What is a VLAN? How to Setup a VLAN on a Cisco Switch," Petri IT Knowledge, Jan. 8, 2009, 5 pages; https://www.petri.com/csc_setup_a_vlan_on_a_cisco_switch.

Serverfault, "What is the difference between unicast, anycast, broadcast and multicast traffic?," Copyright © 2017 Stack Exchange Inc., 6 pages; https://serverfault.com/questions/279482/what-is-the-difference-between-unicast-anycast-broadcast-and-multicast-traffic.

\* cited by examiner

100

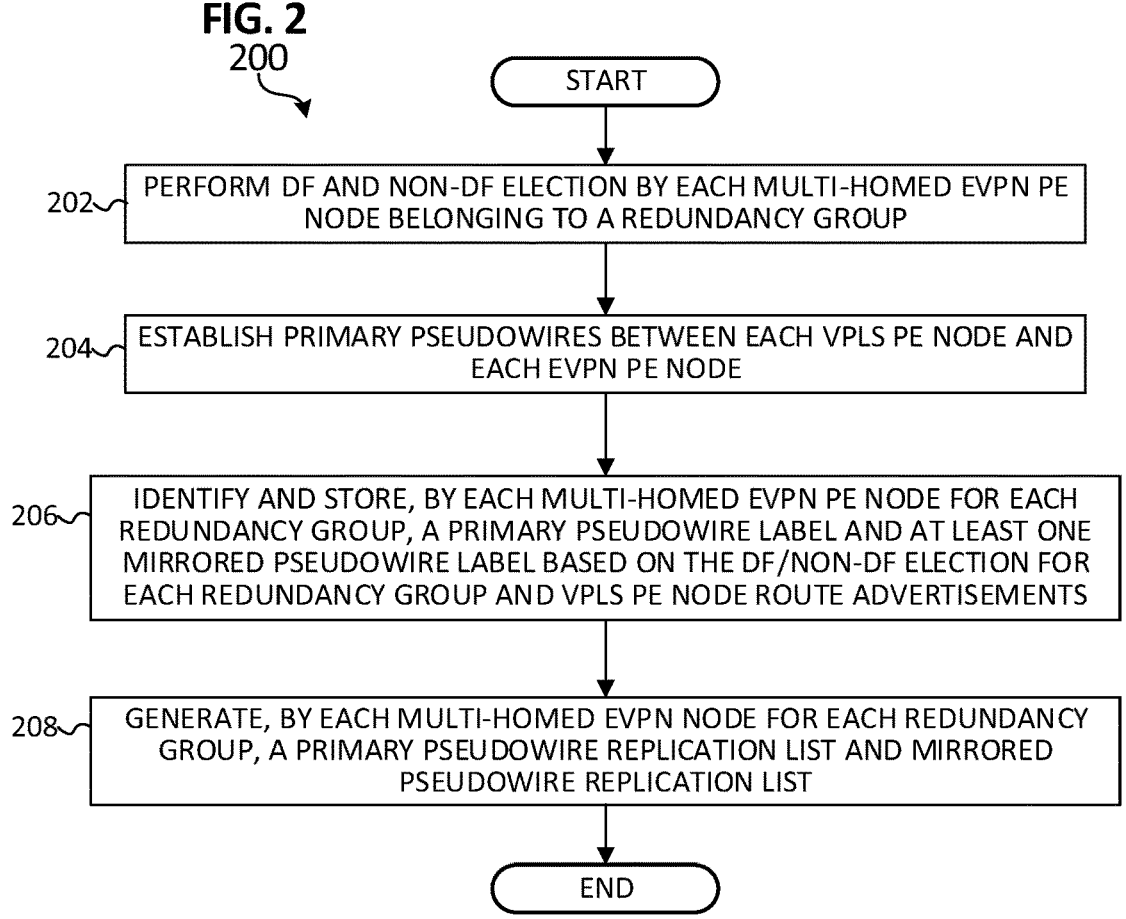
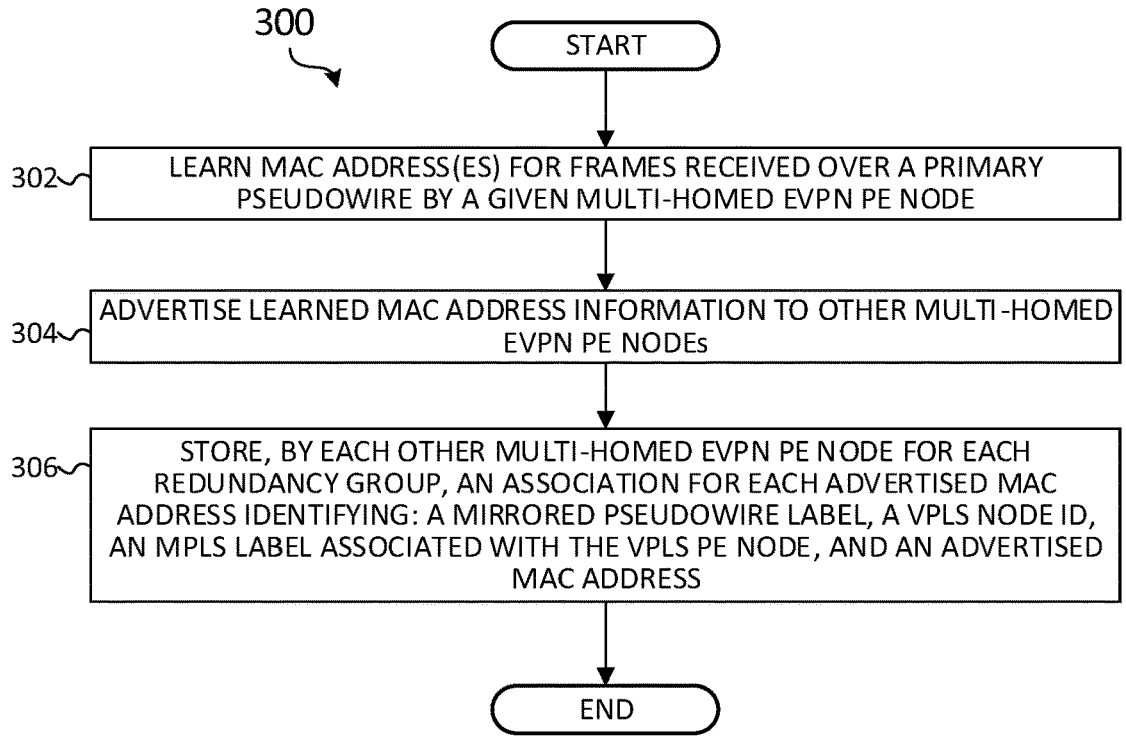

400

500

700

SYSTEM AND METHOD TO FACILITATE INTEROPERABILITY BETWEEN VIRTUAL PRIVATE LAN SERVICE (VPLS) AND ETHERNET VIRTUAL PRIVATE NETWORK (EVPN) WITH ALL-ACTIVE MULTI-HOMING

CROSS-REFERENCE TO RELATED APPLICATION

This application claims the benefit of priority under 35 U.S.C. § 119(e) to U.S. Provisional Application Ser. No. 62/483,136, entitled "SYSTEM AND METHOD TO FACILITATE ETHERNET VIRTUAL PRIVATE NETWORK (EVPN) AND VIRTUAL PRIVATE LOCAL AREA NETWORK SERVICE (VPLS) INTEROPERABILITY FOR ALL-ACTIVE MULTI-HOMING NETWORKS," filed Apr. 7, 2017, which application is hereby incorporated by reference in its entirety.

TECHNICAL FIELD

This disclosure relates in general to the field of computer networking, and more particularly, to a system and method to facilitate interoperability between Virtual Private LAN Service (VPLS) and Ethernet Virtual Private Network (EVPN) with all-active multi-homing.

BACKGROUND

Networking architectures have grown increasingly complex in communication environments. In some cases, owners of enterprise or private networks desire to implement services, which can span across multiple provider edge (PE) networks and can include Ethernet VPN (EVPN) and Virtual Private LAN Service (VPLS) network architectures. Current interoperability between EVPN and VPLS network architectures is limited to single-homing or single-active implementations, which presents significant challenges to provider edge network operators and traffic engineers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified flow diagram illustrating example operations that can be associated with facilitating EVPN-VPLS interoperability for all-active multi-homed devices and networks in accordance with one potential embodiment;

FIG. 3 is a simplified flow diagram illustrating other example operations that can be associated with facilitating EVPN-VPLS interoperability for all-active multi-homed devices and networks in accordance with one potential embodiment;

DETAILED DESCRIPTION OF EXAMPLE EMBODIMENTS

Overview

A method is provided in one example embodiment and may include receiving a frame at a Ethernet Virtual Private Network (EVPN) provider edge (PE) node via an attachment circuit link, wherein the frame is to be forwarded to a Virtual Private Local Area Network (LAN) Service (VPLS) PE node; determining whether the EVPN PE node is a designated forwarder for the attachment circuit link; forwarding the frame using at least one primary pseudowire label based on a determination that the EVPN PE node is the designated forwarder for the attachment circuit link; and forwarding the frame using at least one mirrored pseudowire label based on a determination that the EVPN PE node is not the designated forwarder for the attachment circuit link. The EVPN PE node can be in an all-active multi-homed configuration with at least one other EVPN PE node for a customer edge (CE) device. The frame can be associated with at least one of known unicast traffic; broadcast traffic; unknown unicast traffic; and multicast traffic.

In some instances, the method can include determining that the frame is associated with at least one of broadcast traffic, unknown multicast traffic, or multicast traffic; forwarding the frame to a plurality of VPLS PE nodes based on a primary pseudowire replication list based on a determination that the EVPN PE node is the designated forwarder for the attachment circuit link; and forwarding the frame to a plurality of VPLS PE nodes based on a mirrored pseudowire replication list based on a determination that the EVPN PE node is not the designated forwarder for the attachment circuit link.

In still some instances, the method can include receiving, by the EVPN PE node, a frame via a pseudowire from a VPLS PE node; determining whether a source Medium Access Control (MAC) address contained in the frame has been previously identified by the EVPN PE node; and advertising information associated with the MAC address to other EVPN PE nodes that are in a multi-homed configuration with the EVPN PE Node for a customer edge (CE) device. In some cases, the information advertised by the EVPN PE node can include: the MAC address received from the VPLS PE node; a Multiprotocol Label Switching (MPLS) label associated with the VPLS PE node; and a pseudowire label associated with the pseudowire for which the frame was received.

In still some instances, the method can include storing, by the EVPN PE node, a primary pseudowire label for each VPLS PE node to which the EVPN PE node is connected; and storing, by the EVPN PE node, a mirrored pseudowire label associated with each VPLS PE node for each of one or more other EVPN PE nodes that are in a multi-homed configuration with the EVPN PE node.

EXAMPLE EMBODIMENTS

Figure 1:
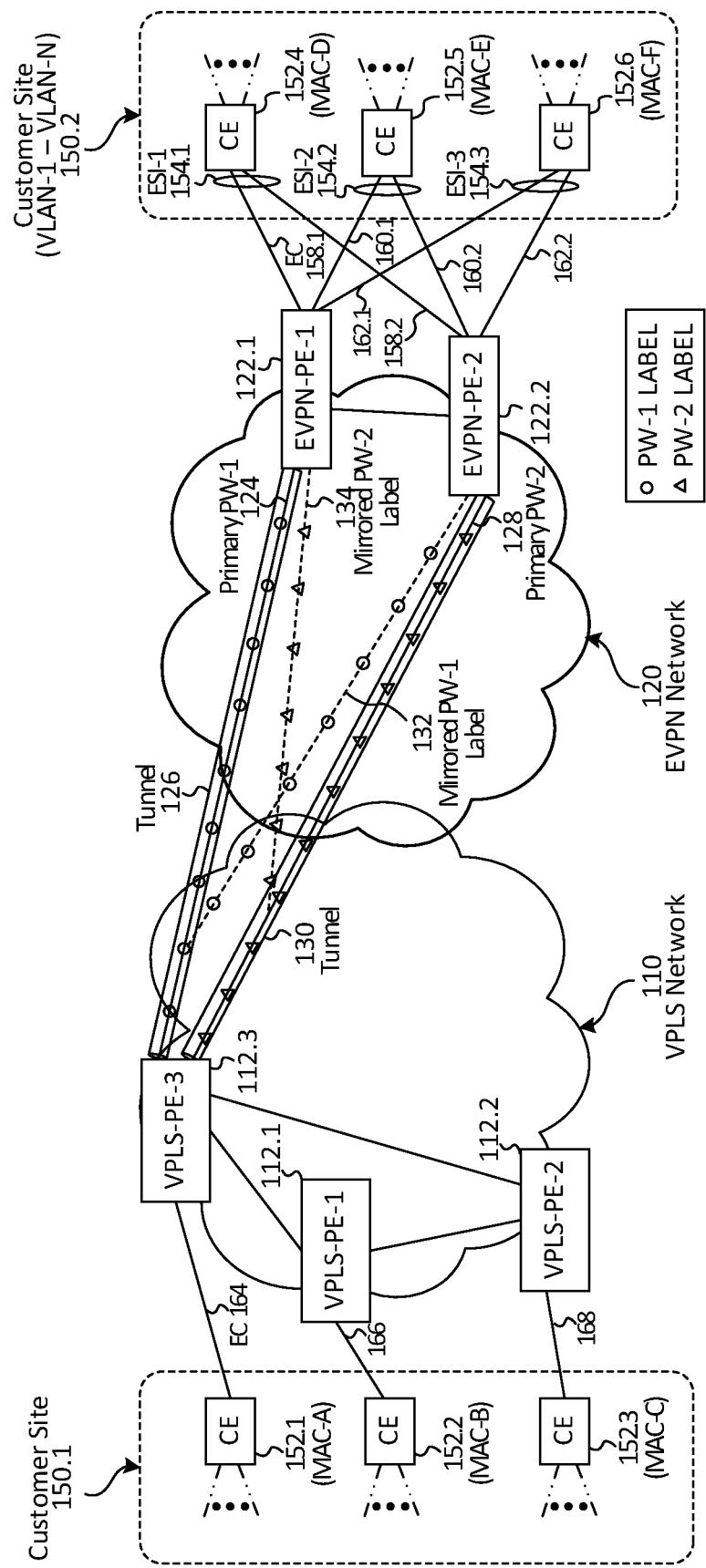
FIG. 1 is a simplified block diagram illustrating example details associated with a communication system that can facilitate Virtual Private LAN Service (VPLS) and Ethernet Virtual Private Network (EVPN) interoperability for all-active multi-homed devices and networks according to one embodiment of the present disclosure.

Referring to FIG. 1, FIG. 1 is a simplified block diagram illustrating example details associated with a communication system 100 that can facilitate Ethernet Virtual Private Network (EVPN) and Virtual Private Local Area Network (LAN) Service (VPLS) interoperability for all-active multi-homed (MH) devices and networks according to one embodiment of the present disclosure. EVPN and VPLS interoperability can be referred to herein as 'EVPN-VPLS' interoperability or variations thereof.

Communication system 100 for the embodiment of FIG. 1 can include a VPLS network 110 and an EVPN network 120 that can be used to interconnect network elements of at least two customer sites, a first customer site 150.1 and a second customer site 150.2. The VPLS network 110 can include a number of Provider Edge (PE) nodes including a first VPLS PE node, VPLS-PE-1 112.1, a second VPLS PE node, VPLS-PE-2 112.2, and a third VPLS PE node VPLS-PE-3 112.3. The EVPN network 120 can include a number of PE nodes including a first EVPN PE node EVPN-PE-1 122.1 and a second EVPN PE node EVPN-PE-2 122.2.

The first customer site 150.1 can include a number of Customer Edge (CE) devices including a first CE device 152.1 having a first Medium Access Control (MAC) address referred to herein as 'MAC-A', a second CE device 152.2 having a second MAC address referred to herein as 'MAC-B', and a third CE device 152.3 having a third MAC address referred to herein as 'MAC-C'. The second customer site 150.2 can include a number of CE devices including a fourth CE 152.4 device having a MAC address referred to herein as 'MAC-D', a fifth CE device 152.5 having a MAC address referred to herein as 'MAC-E, and a sixth CE device 152.6 having a MAC address referred to herein as 'MAC-F'.

As referred to herein in this Specification, any nodes, devices, or the like illustrated in communication system 100 can represent network elements used to exchange communications using one or more communication protocols. Although only a finite number of network elements are illustrated in the communication system 100, it should be understood that any number of network elements can be deployed and/or present in communication system 100 in accordance with various embodiments described herein based on various needs and implementations. As referred to herein in this Specification, the terms 'single-home', 'single-homed', 'single-homing', or variations thereof can be used to refer to a CE device that has an interconnection with one PE node. As referred to herein in this Specification, the terms 'multi-home', 'multi-homed', 'multi-homing', or variations thereof can be used to refer to a CE device that has interconnections with more than one PE node. As referred to herein in this Specification, the terms 'dual-home', 'dual-homed', 'dual-homing', or variations thereof can be used to describe a multi-homed CE device that has interconnections with two (2) PE nodes.

Further as referred to herein in this Specification, the term 'plane' can refer to a separation of traffic that can traverse a network. Three planes can typically be found in communication networks including: a data-plane, a control-plane and a management-plane. The data-plane typically carries user traffic, while the control-plane typically carries signaling traffic used to provide routing information for user data-plane traffic and the management-plane, a subset of the control plane, typically carries administrative traffic. As referred to herein in this Specification, the terms 'user-plane', 'data-plane' and 'user data-plane' can be used interchangeably. As referred to herein in this Specification, the term 'traffic' can refer to one or multiple packets or frames transmitted in a communication system.

For various examples and/or embodiments described herein, discussions may be provided in a general manner for communication system 100 as involving 'VPLS PE nodes' or variations thereof and/or 'EVPN PE nodes' or variations thereof. It should be understood that VPLS PE nodes discussed in relation to communication system 100 can correspond to any VPLS PE nodes that may be present in VPLS network 110 including VPLS-PE-1 112.1, VPLS-PE-2 112.2, and VPLS-PE-3 112.3. Any operations and/or features described herein with regard to a 'VPLS PE node' for communication system 100 can be applicable to any of VPLS-PE-1 112.1, VPLS-PE-2 112.2, and VPLS-PE-3 112.3. Further, it should be understood that EVPN PE nodes discussed in relation to communication system 100 can correspond to any EVPN PE nodes that may be present in EVPN network 120 including EVPN-PE-1 122.1 and EVPN-PE-2 122.2. Any operations and/or features described herein with regard to an 'EVPN PE node' for communication system 100 can be applicable to any of EVPN-PE-1 122.1 and EVPN-PE-2 122.2.

For the embodiment of FIG. 1, each CE device 152.1-152.3 is single homed to each VPLS PE node 112.1-112.3. For example, CE device 152.1 is single-homed to VPLS-PE-3 112.3 via an Ethernet connection (EC) 164; CE device 152.2 is single-homed to VPLS-PE-1 112.1 via an EC 166; and CE device 152.3 is single-homed to VPLS-PE-2 112.2. Each VPLS PE node 112.1-112.3 can be interconnected to provide full-mesh connectivity among the VPLS PE nodes within the VPLS network 110. Although not shown for the embodiment of FIG. 1, it should be understood that each VPLS PE node 112.1-112.3 within VPLS network 110 can have full-mesh connectivity with each EVPN PE node 122.1-122.2 within EVPN network 120. In one embodiment, a logical Multiprotocol Label Switching (MPLS) tunnel can be established between each respective VPLS PE node 112.1-112.3 and each respective EVPN PE node 122.1-122.2 to provide an MPLS infrastructure for interconnecting the VPLS network 110 and the EVPN network 120. In other embodiments, the PE nodes may also be connected by an IP infrastructure that utilizes Generic Routing Encapsulation (GRE) tunneling or other IP tunneling between the PE nodes.

Each EVPN PE node 122.1-122.2 can be provisioned with VPLS forwarding logic that can enable the establishment of logical pseudowires between the VPLS PE nodes 112.1-112.3. Consider, for example, that customer site 150.2 can be configured with an N number of VLANs, which can be identified using VLAN identifiers or 'tags', (e.g., VLAN-1-VLAN-N). In at least one embodiment, a logical pseudowire (PW) can be established between each respective VPLS PE node 112.1-112.3 and each respective EVPN PE node 122.1-122.2 for each of one or more broadcast domains (e.g., VLANs) that can be configured for customer site 150.2. In general, a pseudowire enables Ethernet Protocol Data Units (PDUs), also referred to as Ethernet frames, to be carried over a tunnel. In general, a logical pseudowire is a mechanism that emulates essential attributes of a communication service (e.g., an Ethernet line, etc.) over a packet switched network.

For the embodiment of FIG. 1, a first primary PW 124, which can be identified using a first PW label of 'PW-1', can be established between VPLS-PE-3 112.3 and EVPN-PE-1 122.1 over a tunnel 126 for a particular broadcast domain say, for example, VLAN-1. A second primary PW 128, which can be identified using a second PW label of 'PW-2' can be established between VPLS-PE-3 112.3 and EVPN-PE-2 122.2 over a tunnel 130 for the same broadcast domain say VLAN-1. Each of respective first primary PW 124 and second primary PW 128 can be assigned a respective VPLS PW label (e.g., label PW-1 and label PW-2) by VPLS-PE-3 112.3, which can establish the pseudowires for a given broadcast domain (e.g., VLAN). A mirrored PW-1 label 132 that is associated with the pseudowire label (PW-1) for first primary PW-1 124 and a mirrored PW-2 label 134 that is associated with the pseudowire label for the second primary PW-2 128 are also shown in the embodiment of FIG. 1. For the embodiment of FIG. 1, the primary and mirrored PW-1 labels are represented using circles and the primary and mirrored PW-2 label are represented using triangles. In various embodiments, a 'label' (e.g., PW label, MPLS label, etc.) can represent a fixed length identifier.

Each CE device 152.4-152.6 can be multi-homed to each EVPN PE node 122.1-122.2 using various Ethernet connections (ECs), sometimes referred to as Ethernet 'links'. It should be noted that the multi-homing shown for the embodiment of FIG. 1 is a dual-homed configuration for CE devices 152.4-152.6. For example, CE device 152.4 can have a first EC 158.1 with EVPN-PE-1 122.1 and can have a second EC 158.2 with EVPN-PE-2 122.2. A collection of ECs for a given CE device can represent an Ethernet Segment sometimes referred to as a 'link bundle' that can be identified using an Ethernet Segment Identifier (ESI). For CE 152.4, first and second EC 158.1-158.2 can be identified using an ESI-1 154.1. CE device 152.5 can have a first EC 160.1 with EVPN-PE-1 122.1 and can have a second EC 160.2 with EVPN-PE-2 122.2 to form an ES that can be identified using an ESI-2 154.2. CE device 152.6 can have a first EC 162.1 with EVPN-PE-1 122.1 and can have a second EC 162.2 with EVPN-PE-2 122.2 to form an ES that can be identified using an ESI-3 154.3. Each CE device 152.1-152.6 can be associated with a number of VLANs (e.g., VLAN 1-VLAN-N) configured for customer site 150.2. As referred to herein in this Specification, a particular combination of a particular ES and a particular VLAN can be represented as '<ES, VLAN>' and can be referred to interchangeably as an 'attachment circuit' (AC).

For purposes of illustrating certain example techniques associated with providing EVPN-VPLS interoperability for an all-active multi-homed device or network, it is important to understand potential communications that can be exchanged between PE nodes of such networks. The following foundational information may be viewed as a basis from which the present disclosure may be properly explained. Such information is offered earnestly and for teaching purposes only and, therefore, should not be construed in a way to limit the broad applications and teachings of the present disclosure.

Many types of networks are available, ranging from local area networks (LANs) and wide area networks (WANs) to overlay and software-defined networks, such as virtual extensible local area networks (VXLANs), and virtual networks such as VLANs and virtual private networks (VPNs). LANs typically connect nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), or synchronous digital hierarchy (SDH) links. LANs can include layer 2 (L2) networks and WANs can include both layer 2 and layer 3 (L3) networks and network elements.

The Internet is an example of a public WAN that connects disparate networks throughout the world, providing global communication between nodes on various networks. The nodes typically communicate over the network by exchanging discrete frames or packets of data according to predefined protocols, such as Transmission Control Protocol/Internet Protocol (TCP/IP) or User Datagram Protocol/IP (UDP/IP). In this context, a protocol can refer to a set of rules defining how the nodes interact with each other. Computer networks may be further interconnected by intermediate network nodes, such as routers, switches, hubs, gateways, or the like, which can effectively extend the size or footprint of the network.

A service provider network (e.g., VPLS network 110 and EVPN network 120) can provide service to customer networks via Provider Edge (PE) nodes (e.g. routers, switches, etc.) that are located at the edge of the service provider network. It should be understood that other network elements (e.g., routers, switches, gateways, etc.) can be present in VPLS network 110 and EVPN network 120 to facilitate interconnectivity among the networks. Each PE device may be connected directly to a Customer Edge (CE) device (e.g. host, router, switch, etc.) located at the edge of a customer network. The PE nodes in a service provider network may be connected by an MPLS infrastructure (e.g., MPLS tunnels) that provides benefits such as fast-reroute and resiliency. The PE nodes may also be connected by an IP infrastructure that utilizes GRE tunneling or other IP tunneling between the PE nodes. In general, a tunnel can represent a logical interconnection between two tunnel endpoints (e.g., a VPLS PE node and a EVPN PE node) over which a number of channels or logical pseudowires can be established to exchange communications for different broadcast domains (e.g., VLANs). A PW consists of a set of two labels—one label allocated by a VPLS PE node and sent to an EVPN PE node and the other is allocated from the EVPN PE node and sent to the VPLS PE node.

EVPN is a next generation solution that provides Ethernet point-to-point and multipoint services over IP or MPLS infrastructures. EVPN uses Border Gateway Protocol (BGP) for control-plane MAC address signaling and/or learning. EVPN offers a layer 2 VPN (L2VPN) service built over a Packet Switched Network (PSN) (e.g. utilizing an MPLS/IP infrastructure). An EVPN instance can include CE devices that are connected to PE devices that form the edge of the MPLS infrastructure. An EVPN instance can include one or more broadcast domains (e.g. one or more VLANs) that are assigned to a given EVPN instance by the provider of the EVPN service. A service provider network can include multiple EVPN instances. EVPN networks can provide advanced multi-homing capabilities. For example, an EVPN can support single-homed devices, single-homed networks, multi-homed devices, and multi-homed networks. Multi-homed devices and multi-homed networks can operate either in single-active mode or all-active mode. For multi-homed CE devices operating in all-active mode, IP flows sent to EVPN PE nodes for a given VLAN can be load balanced across links with the PE nodes using Link Aggregation Control Protocol (LACP), as defined by the Institute of Electrical and Electronics Engineers (IEEE) 802.3ad standard. For multi-homed CE devices operating in single-active mode, IP flows for a given VLAN can only be sent to one of the multi-homing EVPN PE nodes.

A VPLS network can be built using a set of full-mesh Ethernet pseudowires among PE nodes where each full-mesh of pseudowires correspond to a given L2 broadcast domain. A VPLS PE can emulate an Ethernet bridge by performing data-plane MAC learning based on traffic arriving over the pseudowires and/or local interfaces. This data-plane MAC learning differs from EVPN MAC learning, as discussed above. A VPLS instance includes a full-mesh of pseudowires associated with a particular broadcast domain (e.g., a VLAN).

Interoperability between VPLS and EVPN networks with all-active multi-homing has been a challenge, which is why it has not been addressed in current networking architectures. By 'all-active', it is meant that a CE device can load balance flows sent to multi-homed EVPN PE nodes to which the CE device is connected over any of the Ethernet connections as opposed to sending flows using one particular Ethernet connection as is performed for a single-homed or single-active multi-homed configuration.

Consider an example customer Ethernet LAN (ELAN) service that spans across the two customer sites say, for example, site S1 and site S2 and three PE nodes say, for example, PE1, PE2, PE3 in which VPLS PE1 is a VPLS PE node; whereas, PE2 and PE3 are EVPN PE nodes. Consider for the present example that site S2 is multi-homed to EVPN PE2 and EVPN PE3 and site S1 is single-homed to VPLS PE1. Consider traffic from S2 to S1 that is sent from a CE device in S2 having an example MAC address say, for example, MAC address 1.1.1.1. Since the traffic for an active VLAN on S2 can arrive at both EVPN PE2 and EVPN PE3 (e.g., due to load balancing by the CE in S2), when such traffic arrives at both EVPN PE2 and EVPN PE3 that traffic gets forwarded by each EVPN node across each node's corresponding pseudowire to VPLS PE1.

In such an example, because VPLS PE1 receives the traffic for the same source MAC address (e.g., 1.1.1.1) over two different pseudowires its learning and association of source MAC (for the CE device in S2) to a particular pseudowire, keeps 'flip-flopping' (e.g., an association for the source MAC flips-flops between an association with the pseudowire between VPLS PE1 and EVPN PE2 and an association with the pseudowire between VPLS PE1 and EVPN PE3). This flip-flopping can deter VPLS PE1 MAC learning and cause excessive loading on VPLS PE1.

Because of these multi-homing challenges, when interoperability between EVPN and VPLS is needed, one current solution provides that EVPN and VPLS interoperability can be provided by limiting EVPN PEs in a single-active mode (e.g., biasing traffic to one EC) or, if the PEs need to be operated in an all-active mode, then the current solution suggests the use gateways (GWs) between EVPN and VPLS networks in which the GWs are operated in a single-active mode toward the VPLS network. However, there is a growing list of service providers that don't like either of these approaches because: a) their PEs/Top-of-Rack servers (TORS) are multi-homed and operating in all-active mode; and/or b) they don't want to use GWs because: 1) the GWs present additional touch points and result in additional provisioning, 2) providing such GWs results in higher capital expenditure (CAPEX) because each GW needs to be a high-scale box, and/or 3) using such GWs can create a lack of optimum forwarding because the traffic only gets forwarded from one of the GWs and thus can balloon if a GW is in different Local Access and Transport Area (LATA) than source and destination PEs.

Embodiments of communication system 100 described herein can overcome the aforementioned issues (and others) by providing a solution in which EVPN PE nodes (e.g., EVPN-PE-1 122.1 and EVPN-PE-2 122.2) can be provisioned to operate in an all-active mode for interoperability with VPLS PE nodes (e.g., VPLS-PE-1 112.1, VPLS-PE-2 112.2, and VPLS-PE-3 112.3) without the use of gateways and without causing MAC flip-flopping at the VPLS PEs. It should be noted that although embodiments of the solution described herein is discussed in reference to VPLS and EVPN interoperability with all-active multi-homing deployments, embodiments of the solution can also facilitate seamless interoperability between EVPN services and Virtual Private Wire Service (VPWS) with all-active multi-homing. In various embodiments, the solution that can be used to mirror VPLS pseudowires can also be used to mirror VPWS pseudowires together. Therefore, embodiments of the solution discussed herein can find broad applicability to both legacy VPLS and VPWS architectures.

To eliminate MAC flip-flopping during operation, communication system 100 can operate such that regardless of which dual-homed EVPN PE node receives traffic (e.g., frames) from a given dual-homed CE device (e.g., a CE dual-homed device at second customer site 150.2), each dual-homed EVPN PE node can use a same PW label for forwarding traffic from the given dual-homed CE device towards a given destination VPLS PE node. Thus, regardless of the EVPN PE node forwarding traffic to a given VPLS PE node, the given VPLS PE node can associate learned MAC addresses with a common pseudowire label, rather than flip-flopping the association between different pseudowires labels.

In accordance with at least one embodiment, each EVPN PE node in EVPN network 120 can be provisioned to maintain a primary PW label and a mirrored PW label for each PW established between each VPLS PE node in VPLS network 110 and each EVPN PE node in the EVPN network 120. A primary PW label can represent a PW label that a given EVPN PE node is to use in forwarding traffic toward a VPLS PE node for traffic received via a particular attachment circuit (e.g., a particular <ES, VLAN>) for which the given EVPN PE node is identified as a designated forwarder (DF). A mirrored PW label can represent a PW label that a given EVPN PE node is to use in forwarding traffic toward a VPLS PE node for traffic received via a particular attachment circuit for which the given EVPN PE node is not identified as a DF (e.g., the EVPN PE node is a non-DF EVPN PE node for the particular attachment circuit). A mirrored PW label can be set to the same value as the primary PW that is used by a DF EVPN PE node for a given attachment circuit.

Data-Plane Operations

During operation, each EVPN PE node 122.1-122.2 can perform a DF election process for each VLAN associated with customer site 150.2. In at least one embodiment, a DF election process can involve an EVPN PE node for a given EVPN network identifying a number of VLANs configured for a given customer site and performing a modulo (MOD) operation to determine which respective <ES, VLAN> the EVPN PE node is to serve as a DF. A DF election can be performed to identify which EVPN PE node is to forward Broadcast/Unknown Unicast/Multicast (BUM) traffic from VPLS network 110 to customer site 150.2 for each <ES, VLAN> of customer site 150.2. Say, for example, that during a DF election process EVPN-PE-1 122.1 determines that it is to be the DF for <ESI-1, VLAN-1> and EVPN-PE-2 122.2 determines that it is to be the DF for <ESI-2, VLAN-1>. As noted previously, a VLAN can be mapped to a VPLS instance (e.g., a full-mesh of pseudowires established for a VLAN).

As discussed in further detail herein, embodiments of communication system 100 can leverage the DF election of EVPN PE nodes, which is typically used for forwarding BUM traffic over an attachment circuit between an EVPN PE node and a CE device, to eliminate MAC flip-flopping for traffic that is received via an attachment circuit and forwarded towards VPLS PE nodes in VPLS network 110.

Control-Plane Operations

During operation, in at least one embodiment, each VPLS PE node 112.1-112.3 can be fully meshed with each other and with each EVPN PE node 122.1-122.3 with tunnels (e.g., tunnels 126, 130) such as IP (e.g., GRE) tunnels or MPLS tunnels over which traffic that belong to a service (e.g., VPLS) can be encapsulated and forwarded using Ethernet frames. In various embodiments, tunnels can be established using Resource Reservation Protocol for Traffic Engineering (RSVP-TE), Label Distribution Protocol (LDP), or the like.

Each VPLS PE node can perform VPLS-BGP control-plane route advertisements to each EVPN PE node that identify a logical pseudowire established between each VPLS PE node and each EVPN PE node. In at least one embodiment, the route advertisements can be triggered based on a VPLS auto-discovery process in which VPLS and EVPN nodes participate. Based on the advertisements, each multi-homed EVPN PE node in a redundancy group (e.g., a group of EVPN PE nodes to which each of a given CE device is multi-homed) can derive a primary PW label and a mirrored PW label for each pseudowire based on a DF election for each EVPN PE node in the redundancy group. In at least one embodiment, VPLS-BGP advertisements can be performed by VPLS PE nodes in VPLS network 110 as prescribed in Internet Engineering Task Force (IETF) Request For Comments (RFC) 4761.

During operation, each EVPN PE node 122.1-122.2 can announce to each VPLS PE node 112.1-112.3 that each EVPN PE node belongs to a given VPLS instance in order for each VPLS PE node 112.1-112.3 to complete an auto-discovery process in which each EVPN PE node is identified by each VPLS PE node. Following the auto-discovery process, signaling processes can be performed to establish a primary PW between each VPLS PE node and each EVPN PE node. As noted in RFC 4761, a VPLS-BGP announcement can include a label block that includes among other information, a VPLS edge device identifier (VE-ID) and a Route Distinguisher. In various embodiments, a VE-ID can be a 16-bit value that uniquely identifies a VPLS PE node for a given VPLS network.

VPLS-BGP route advertisement signaling is broadcast among all VPLS PE nodes for a given VPLS instance. Because EVPN PE nodes within EVPN network 120 can be provisioned with VPLS forwarding logic, the EVPN PE nodes appear as VPLS PE nodes to each PE node in VPLS network 110 and therefore can 'hear' all the route advertisement signaling performed for a VPLS instance. In general, a label block can include a number of VE-IDs that can be used for PW establishment for a number of EVPN-PE nodes in the EVPN network. As each EVPN PE node in the network is configured with information about each other for a multi-homing CE site, each EVPN PE node in a dual-homing redundancy group for a particular ESI can determine the PW label assigned to the other EVPN-PE node in the dual-homing group.

For example, consider VPLS-PE-3 112.3 performs route advertisement signaling with EVPN-PE-1 112.1 to establish the first primary PW-1 124 for a particular broadcast domain (e.g., VLAN-1) having a 'PW-1' pseudowire label and VPLS-PE-3 112.3 performs route advertisement signaling with EVPN-PE-2 112.2 to establish a second primary PW-2 128 for the same broadcast domain (e.g., VLAN-1) having a 'PW-2' pseudowire label say. Based on a determined DF election for a given redundancy group, each EVPN PE node within the redundancy group can determine a mirrored PW that is to be used when forwarding traffic for a VLAN for which it is not the DF based on VPLS-BGP route advertisements signaled by a VPLS PE node.

For example, consider dual-homed EVPN-PE-1 122.1 and EVPN-PE-2 122.2 belonging to a redundancy group for each CE device 152.4-152.6 in which EVPN-PE-1 122.1 determines that it is the DF for <ESI-1, VLAN-1> for customer site 150.2 and EVPN-PE-2 122.2 determines that it is the DF for <ESI-2, VLAN-1> for customer site 150.2.

Based on VPLS-BGP route advertisement signaling between VPLS-PE-3 112.3 and EVPN-PE-1 122.1, EVPN-PE-1 122.2 can infer the mirrored PW-1 label 132 that it is to use for forwarding traffic to VPLS-PE-3 112.3 that is received from customer site 150.2 for <ESI-1, VLAN-1>. The mirrored PW-1 label 132 will have the same value as the primary PW-1 label 124 that would be used by EVPN-PE-1 112.1 for forwarding traffic received from <ESI-1, VLAN-1> towards VPLS-PE-3 112.3. Similarly, based on VPLS-BGP route advertisement signaling between VPLS-PE-3 112.3 and EVPN-PE-2 122.2, EVPN-PE-1 122.1 can infer the mirrored PW-2 label 134 that it is to use for forwarding traffic to VPLS-PE-3 112.3 that is received from customer site 150.2 for <ESI-2, VLAN-1>. The mirrored PW-2 label 134 will have the same value as the primary PW-2 label 128 that would be used by EVPN-PE-2 122.2 to forward traffic received <ESI-2, VLAN-1> towards VPLS-PE-3 112.3.

Thus in at least one embodiment, a particular dual-homed EVPN PE node (e.g., EVPN nodes 122.1) for a given EVPN network (e.g., EVPN network 120) can store a primary PW label that identifies the primary PW established between itself and a given VPLS PE node for any <ES, VLAN> for which the particular dual-homed EVPN PE node is the DF and a mirrored PW label that identifies another primary PW label that is established between the given VPLS PE node and the other dual-homed EVPN PE node for any <ES, VLAN> for which the other dual-homed EVPN PE node is the DF. As discussed in further detail below, a primary pseudowire replication list and a mirrored pseudowire replication list can be generated based on stored primary and mirrored pseudowire labels.

EVPN control-plane signaling operations can also be performed among EVPN nodes 122.1-122.2 to synchronize MAC addresses learned over a primary PW by a given EVPN node that receives traffic from a given VPLS PE node to be forwarded to customer site 150.2.

In at least one embodiment, EVPN PE nodes 122.1-122.2 can be enhanced to learn and store source MAC addresses that have been received in frames forwarded from VPLS PE nodes 112.1-112.3. For example, say VPLS-PE-3 112.3 receives a frame from CE device 152.1 that includes a source MAC address set to MAC-A and forwards the frame via primary PW-1 124 to EVPN-PE-1 122.1. Upon receiving the frame, EVPN-PE-1 122.1 can query its stored source MAC addresses to determine whether it had previously received a frame from CE device 152.1 having a MAC address set to MAC-A. Based on a determination that it had previously received a frame from the CE device, forwarding operations can continue normally for EVPN-PE-1 122.1 for forwarding the frame to a particular CE device at customer site 150.2 based on the destination MAC address included in the frame. However, based on a determination that it had not previously received a frame from the CE device, EVPN-PE-1 122.1 can learn that MAC address and then can advertise it to EVPN-PE-2 122.2, via control-plane signaling, an indication (e.g., the MAC address and the PW label for the received frame) for forwarding traffic toward MAC-A address that may be received by EVPN-PE-2 122.2 from customer site 150.2. EVPN-PE-2 122.2 can store the PW-1 for VPLS-PE-3 112.3 in association with MAC address MAC-A. EVPN-PE-1 122.1 can forward the frame to a particular CE device at customer site 150.2 based on the destination MAC address included in the frame.

Unicast Traffic Data-Plane Forwarding Operations

During operation for a dual-homed EVPN PE node deployment in at least one embodiment, based on a determination that known unicast traffic is received by an EVPN PE node for a particular <ES, VLAN> for which the EVPN PE node is the DF, the DF EVPN PE node can use its primary PW label in traffic forwarded to a VPLS PE node. In at least one embodiment, an EVPN PE node can determine that unicast traffic is known if it has stored the destination MAC address included in traffic, otherwise the traffic is unknown. Based on a determination that known unicast traffic is received by an EVPN PE node for a particular <ES, VLAN> for which the EVPN node is not the DF, the non-DF EVPN PE node can use a mirrored PW label (e.g., the primary PW label that is used by the other dual-homed EVPN PE node that is the DF for the particular <ES, VLAN>) in traffic forwarded to a VPLS PE node. In other words, EVPN PE nodes can use the DF/non-DF election status to determine whether to use a primary PW label or a mirrored PW label in traffic forwarded to a VPLS PE node.

BUM Traffic Data-Plane Forwarding Operations

Broadcast traffic (e.g., one source sent to many destinations), unknown unicast traffic, and multicast traffic (e.g., one or many source(s) sent to many destinations) are typically referred to as 'BUM' traffic. During operation for a dual-homed EVPN PE node deployment in at least one embodiment, based on a determination that BUM traffic is received by an EVPN PE node from a customer site for a particular <ES, VLAN> for which the EVPN PE node is the DF, the DF EVPN PE node can use its own primary PW replication list to determine a primary PW label to include in BUM traffic forwarded to each of the multiple VPLS PE nodes to which the BUM traffic is to be forwarded. In at least one embodiment, broadcast and multicast traffic can be identified based on the destination MAC address, however, unknown unicast can be identified as discussed above based on whether the destination MAC address is stored by an EVPN PE node. Based on a determination that BUM traffic is received by an EVPN PE node from a customer site for a particular <ES, VLAN> for which the EVPN node is not the DF, the non-DF EVPN PE node can use a mirrored PW replication list to determine a mirrored PW label to include in BUM traffic forwarded to each of the multiple VPLS PE nodes to which the BUM traffic is to be forwarded.

In at least one embodiment, a primary PW replication list can consist of primary PW labels that an EVPN PE node is to use to forward BUM traffic for all VPLS PE nodes to which the EVPN PE node is to forward traffic for each <ES, VLAN> for which the EVPN PE node is the DF. In at least one embodiment, a mirrored PW replication list can consist of mirrored PW labels that an EVPN PE node is to use to forward BUM traffic for all VPLS PE nodes to which the EVPN PE node is to forward traffic for each <ES, VLAN> for which the EVPN PE node is not the DF. Each EVPN PE node for a given EVPN network (e.g., EVPN-PE-1 122.1 and EVPN-PE-2 122.2 for EVPN network 120) can generate a primary PW replication list and a mirrored PW replication list following initial or updated (e.g., following a link failure, etc.) DF election operations for the given EVPN network.

In at least one embodiment, BUM traffic sent from a VPLS network can be flagged with a BUM marking by the disposition EVPN PE node. At the egress AC link (e.g., <ES, VLAN>) all BUM traffic can either be forwarded as would typically be performed by a DF EVPN PE node or can be filtered (e.g., dropped) by a non-DF EVPN PE node based on the BUM marking.

Failure Handling Operations

During operation, based on a link failure for a given DF EVPN PE node in at least one embodiment, the given DF EVPN PE node can send mass withdraw signaling per-ES and per-VLAN (for which the EVPN PE node was a DF) to other EVPN PE nodes and the other EVPN PE nodes can adjust their path list to only use the non-DF EVPN PE node for a given redundancy group. The given DF EVPN PE node that experienced the link failure can also send VPLS flush messages to each VPLS PE node with which the DF EVPN PE node had a primary PW established in indicate to each VPLS PE node to delete all MAC addresses learned over the PW. The non-DF PE node would then become the DF for the link and would use its own primary PW labels for send traffic towards VPLS PE nodes.

Based on a link failure for a given non-DF EVPN PE node in at least one embodiment, the given non-DF EVPN PE node can send a mass withdraw per-ES and per-VLAN (for which the EVPN PE node was the non-DF) to other EVPN PE nodes and the other EVPN PE nodes can adjust their path list to only use the DF EVPN PE node for a given redundancy group. The given non-DF EVPN PE node would not send VPLS flush messages.

Various advantages can be realized using the embodiments of the solution described herein and can include, but not be limited to: 1) introducing EVPN deployments capable of all-active mode EVPN PE nodes into brown field deployment of VPLS networks (e.g., existing VPLS networks to which EVPN PE nodes can be added to) and retaining the advantages for EVPN all-active multi-homing while eliminating flip-flopping for MAC address learning by VPLS PE nodes; and/or 2) providing a service provider the option of not using a gateway and the benefits that comes from not using a gateway such as, for example, a) lowering the number of touch points (lower provisioning), b) lowering capital expenditures, and/or c) providing optimum forwarding between source and destination PEs.

Referring to FIG. 2, FIG. 2 is a simplified flow diagram illustrating example operations 200 that can be associated with facilitating EVPN-VPLS interoperability for all-active multi-homed networks in accordance with one potential embodiment. In at least one embodiment, operations 200 can be performed by any combination of EVPN PE nodes (e.g., EVPN PE nodes 122.1-122.2) and VPLS PE nodes (e.g., VPLS PE nodes 112.1-112.3) that may be deployed in a fully-meshed EVPN-VPLS deployment.

In at least one embodiment, the operations can begin at 202 with each multi-homed EVPN PE node of one or more redundancy group(s) of an EVPN network performing a DF and non-DF election for each <ES, VLAN> configured for a customer site. At 204, each VPLS PE node of a VPLS network can establish primary pseudowires with each multi-homed EVPN PE node. In at least one embodiment, the primary pseudowires can be established using VPLS-BGP route advertisements, which can enable each multi-homed EVPN PE node to identify primary pseudowires between each VPLS PE node and other multi-homed EVPN PE nodes for the network.

At 206, the operations can include each multi-homed EVPN PE node for each redundancy group identifying and storing a primary pseudowire label and at least one mirrored pseudowire label based on the DF/non-DF election for each redundancy group and VPLS PE node route advertisements. Each multi-homed EVPN PE node can generate (208) a primary pseudowire replication list and a mirrored pseudowire replication list based on the identification and storage performed at 206 and the operations can end.

Referring to FIG. 3, FIG. 3 is a simplified flow diagram illustrating other example operations 300 that can be associated with facilitating EVPN-VPLS interoperability for all-active multi-homed networks in accordance with one potential embodiment. In at least one embodiment, operations 300 can be performed by any combination of EVPN PE nodes (e.g., EVPN PE nodes 122.1-122.2) and VPLS PE nodes (e.g., VPLS PE nodes 112.1-112.3) that may be deployed in a fully-meshed EVPN-VPLS deployment.

At 302, the operations can include a given multi-homed EVPN PE node learning one or more MAC addresses for one or more remote CE devices interconnected to one or more VPLS PE node(s). In at least one embodiment, the learning at 302 can include the EVPN PE node receiving a frame and determining that a source MAC address contained in the frame has not been previously received in a frame by the EVPN node (e.g., by performing a lookup, etc. on learned MAC addresses). At 304, the operations can include the EVPN PE node advertising learned MAC address information to other multi-homed EVPN PE nodes.

In at least one embodiment, the learned MAC address information can include, but not be limited to: a pseudowire label associated with the pseudowire upon which the frame was received, an MPLS tunnel endpoint label associated with the VPLS PE node from which the frame was received, and an associated MAC address that was learned.

At 306, each other multi-homed EVPN PE node for each redundancy group can store an association for each advertised MAC address that identifies: the advertised pseudowire label, MPLS label, and MAC address.

Figure 4:
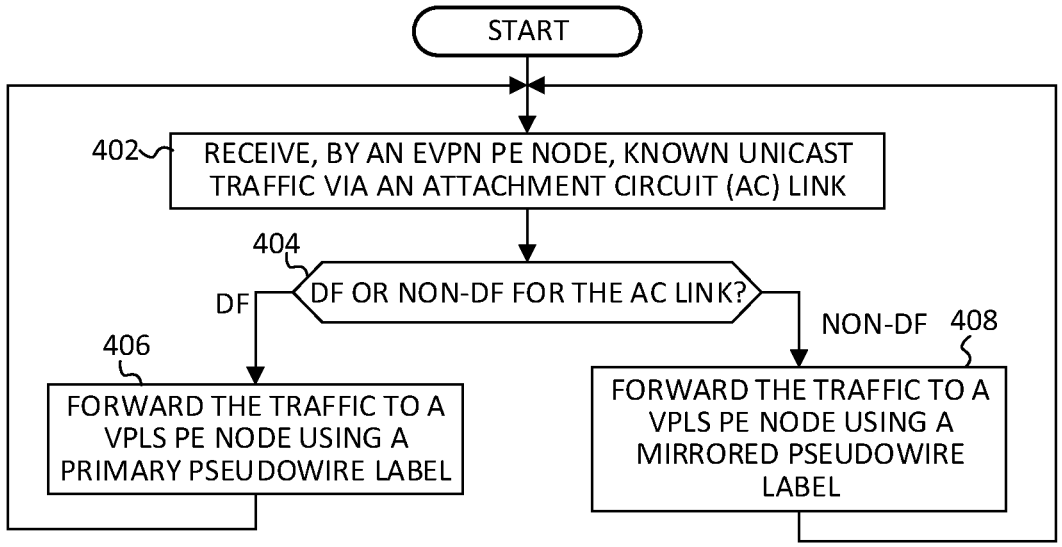
FIG. 4 is a simplified flow diagram illustrating example operations that can be associated with forwarding known unicast traffic received via an attachment circuit link in accordance with one potential embodiment.

Referring to FIG. 4, FIG. 4 is a simplified flow diagram illustrating example operations 400 that can be associated with forwarding known unicast traffic received via an attachment circuit link in accordance with one potential embodiment. In at least one embodiment, operations 400 can be performed by any EVPN PE node (e.g., EVPN PE nodes 122.1, 122.2) that may be deployed in a fully-meshed EVPN-VPLS deployment.

At 402, the operations can include an EVPN PE node receiving known unicast traffic via an Attachment Circuit (AC) link (e.g., a <ES, VLAN> link). At 404, the operations can include the EVPN PE node determining whether it is the DF or the non-DF for the AC link. Based on a determination at 404 that the EVPN PE node is the DF for the AC link, the EVPN PE node can forward (406) the traffic to a VPLS PE EVPN PE node using a primary pseudowire label (e.g., including the primary pseudowire label in each frame of the traffic forwarded to the VPLS PE node) and the operations can return to 402 for the operations to be repeated for any received traffic. Based on a determination at 404 that the EVPN PE node is the non-DF for the AC link, the EVPN PE node can forward (408) the traffic to a VPLS PE node using a mirrored pseudowire label (e.g., including the mirrored pseudowire label in each frame of the traffic forwarded to the VPLS PE node) and the operations can return to 402 for the operations to be repeated for any received traffic.

Figure 5:
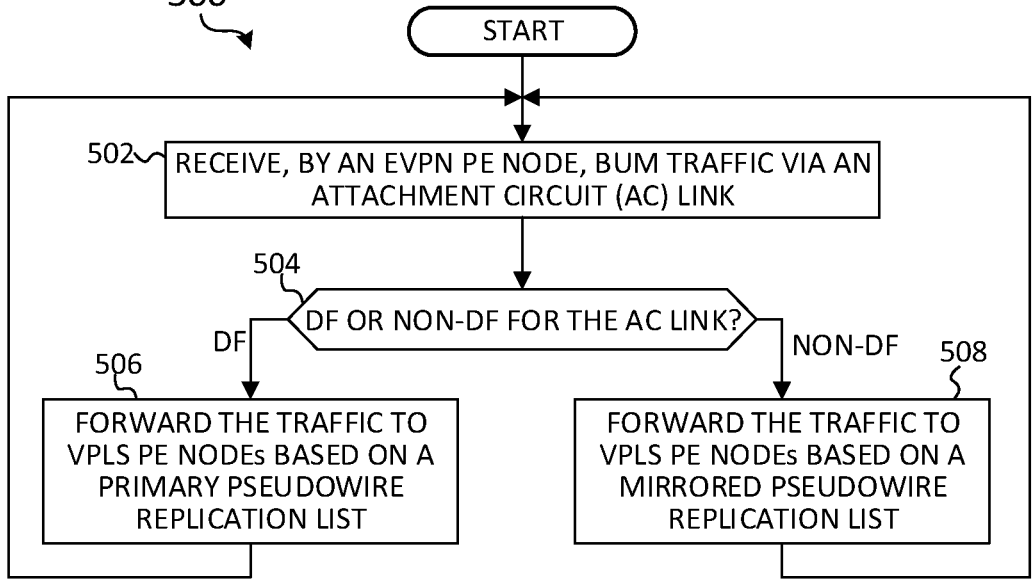
FIG. 5 is a simplified flow diagram illustrating other example operations that can be associated with forwarding other traffic received via an attachment circuit link in accordance with one potential embodiment.

Referring to FIG. 5, FIG. 5 is a simplified flow diagram illustrating example operations 500 that can be associated with forwarding BUM traffic received via an attachment circuit link in accordance with one potential embodiment. In at least one embodiment, operations 500 can be performed by any EVPN PE node (e.g., EVPN PE nodes 122.1, 122.2) that may be deployed in a fully-meshed EVPN-VPLS deployment.

At 502, the operations can include an EVPN PE node receiving BUM traffic via an Attachment Circuit (AC) link (e.g., a <ES, VLAN> link). At 504, the operations can include the EVPN PE node determining whether it is the DF or the non-DF for the AC link. Based on a determination at 504 that the EVPN PE node is the DF for the AC link, the EVPN PE node can forward (506) the traffic to a VPLS PE node based on a primary pseudowire replication list (e.g., including a respective primary pseudowire label in each frame of the traffic forwarded for each respective VPLS PE node to which the traffic is to be forwarded according to the primary pseudowire replication list) and the operations can return to 502 for the operations to be repeated for any received traffic. Based on a determination at 504 that the EVPN PE node is the non-DF for the AC link, the EVPN PE node can forward (508) the traffic based on a mirrored pseudowire replication list (e.g., including a respective mirrored pseudowire label in each frame of the traffic forwarded for each respective VPLS PE node to which the traffic is to be forwarded according to the mirrored pseudowire replication list) and the operations can return to 502 for the operations to be repeated for any received traffic.

Figure 6:
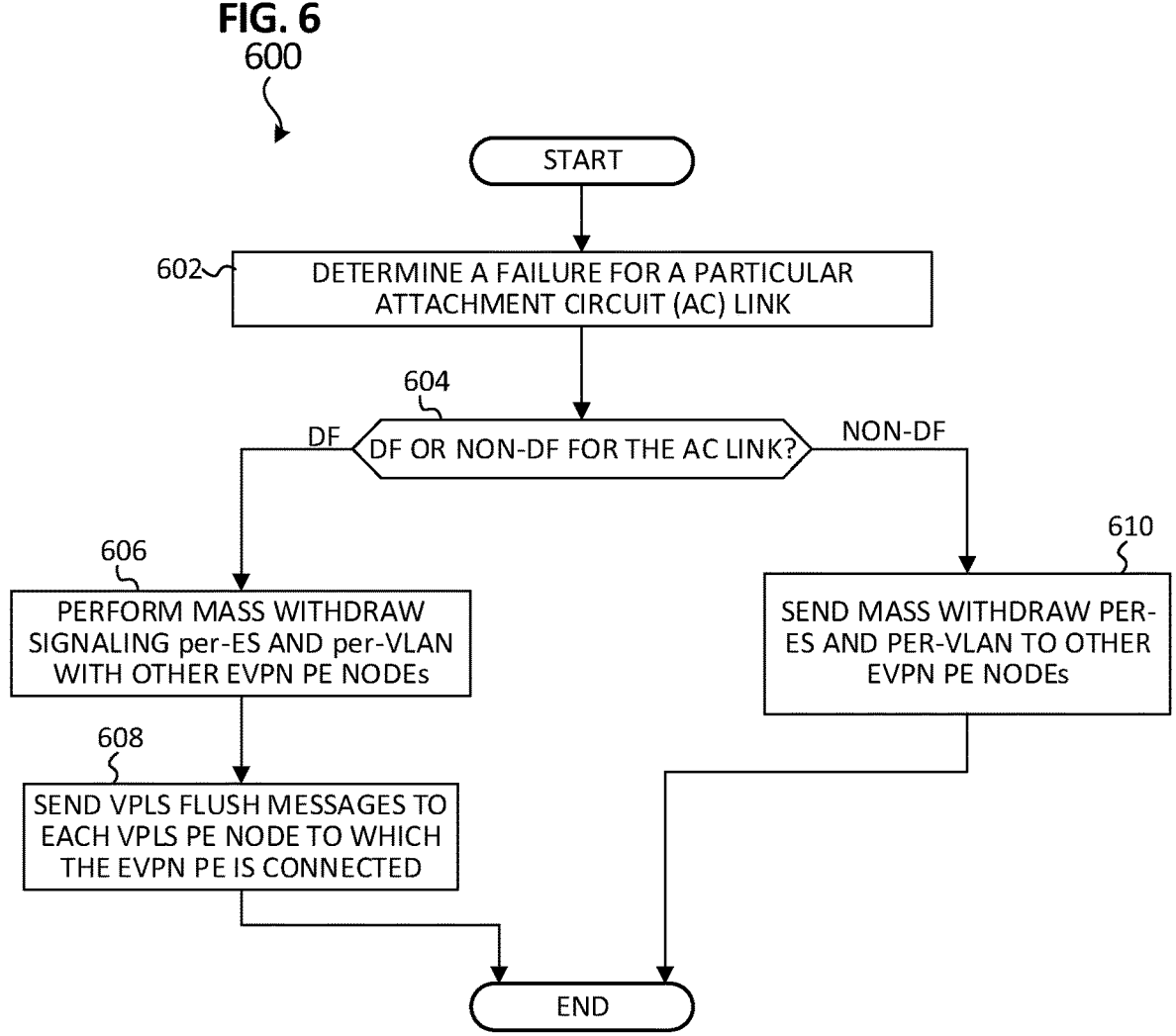
FIG. 6 is a simplified flow diagram illustrating example operations that can be associated handling an attachment circuit link failure in accordance with one potential embodiment.

Referring to FIG. 6, FIG. 6 is a simplified flow diagram illustrating example operations 600 that can be associated handling an attachment circuit link failure in accordance with one potential embodiment. In at least one embodiment, operations 600 can be performed by any EVPN PE node (e.g., EVPN PE nodes 122.1, 122.2) that may be deployed in a fully-meshed EVPN-VPLS deployment.

At 602, the operations can include an EVPN PE node determining that a link failure has occurred for a particular Attachment Circuit (AC) link. At 604, the operations can include the EVPN PE node determining whether it is the DF or the non-DF for the AC link. Based on a determination at 604 that the EVPN PE node is the DF for the AC link, the EVPN PE node can perform mass withdraw signaling per-ES and per-VLAN with other EVPN PE nodes at 606 and can send (608) VPLS flush messages to each VPLS PE node to which the EVPN PE node is connected and the operations can end. Any EVPN PE nodes receiving withdraw signaling from a DF EVPN PE node can adjust their path list to only use the non-DF EVPN PE node for a given redundancy group.

Based on a determination at 604 that the EVPN PE node is the non-DF for the AC link, the EVPN PE node can perform mass withdraw signaling per-ES and per-VLAN with other EVPN PE nodes at 610. Any EVPN PE nodes receiving withdraw signaling from a DF EVPN PE node can adjust their path list to only use the DF EVPN PE node for a given redundancy group.

Figure 7:
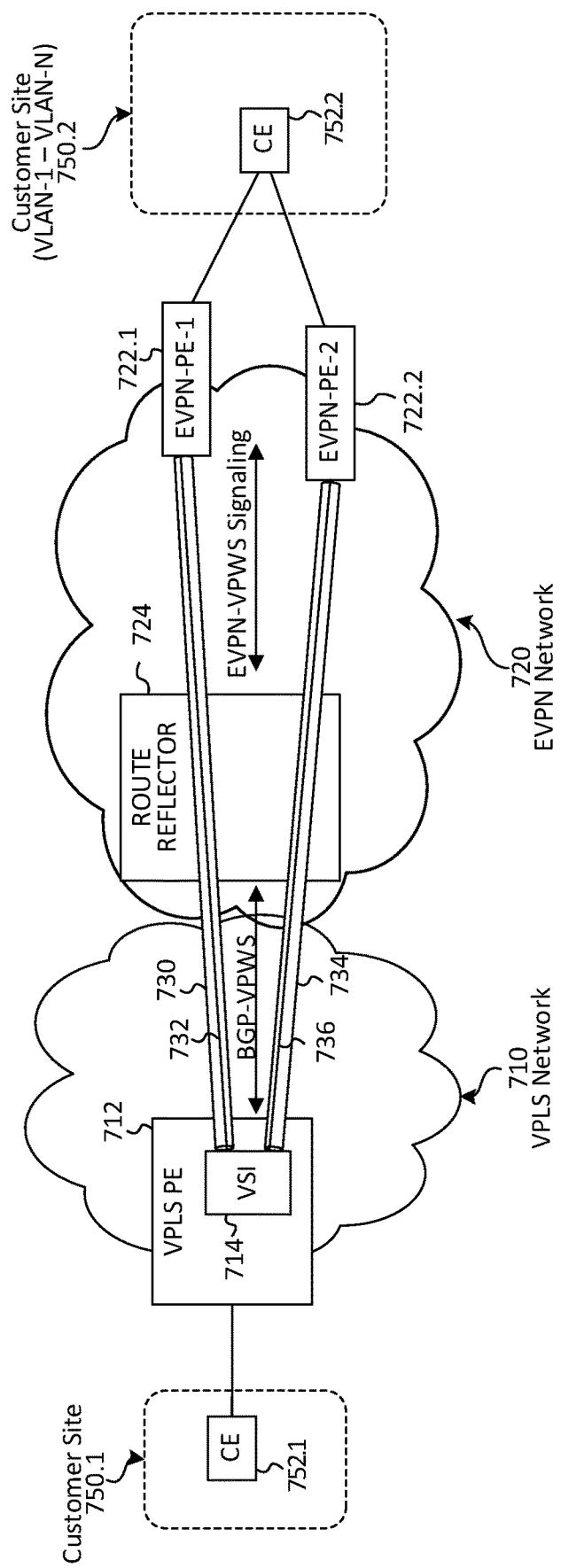
FIG. 7 is a simplified block diagram illustrating other example details that can be associated with another communication system that can facilitate EVPN-VPLS interoperability for all-active multi-homed devices and networks according to one potential embodiment.

Referring to FIG. 7, FIG. 7 is a simplified block diagram illustrating example details that can be associated with another communication system 700 that can facilitate EVPN-VPLS interoperability for all-active multi-homed networks according to one potential embodiment. As noted previously, embodiments of the solution described herein can be used to facilitate seamless interoperability between EVPN services and VPWS services (EVPN-VPWS) with all-active multi-homing.

As illustrated for the embodiment of FIG. 7, communication system 700 can include a first customer site 750.1 including a first CE device 752.1, a second customer site 750.2 including a second CE device 752.2, a VPLS network 710 including a VPLS PE node 712, and an EVPN network 720 including a route reflector 724 and dual-homed EVPN PE nodes, EVPN-PE-1 722.1 and EVPN-PE-2 722.2 in an all-active configuration dual-homed to second CE device 752.2. VPLS PE node 712 can be configured with a virtual switching instance (VSI) 714. In various embodiments, a VSI (e.g., VSI 714) can perform standard LAN (e.g., Ethernet) bridging functions such as, for example, forwarding based on MAC addresses or VLAN tags. A tunnel 730 can be used as a logical interconnect between VSI 714 for VPLS PE node 712 and EVPN-PE-1 722.1 and a tunnel 734 can be used as a logical interconnect between VSI 714 for VPLS PE node 712 and EVPN-PE-2 722.2. A logical pseudowire 732 can be established between VSI 714 for VPLS PE node 712 and EVPN-PE-1 722.1 for one example broadcast domain (e.g., VLAN-1) and a logical pseudowire 736 can be established between VSI 714 for VPLS PE node 712 and EVPN-PE-2 722.2 for the same broadcast domain (e.g., VLAN-1).

In some embodiments, service providers may desire to deploy EVPN PE nodes that are only capable of EVPN protocol operations. In such embodiments, as shown in FIG. 7, route reflector 724 can perform translation between EVPN-VPWS signaling for respective pseudowires 732 and 736 terminated at respective EVPN PE nodes 722.1 and 722.2 within EVPN network 720 and BGP-VPWS signaling for the pseudowires 732 and 736 terminated at VSI 714 for VPLS PE node 712. For an embodiment as shown in FIG. 7, all broadcast domains can be modeled on multi-homed EVPN PE nodes as a virtual ES where one end of an EVPN-VPWS service instance is terminated. Other operations as discussed for various embodiments described herein can be performed with route reflector 724 performing protocol translations between the VPLS network 710 and the EVPN network 720 such that forwarding from EVPN PE nodes 722.1-722.2 toward VPLS network 710 can be performed based on the DF/non-DF election for a given attachment circuit.

Figure 8:
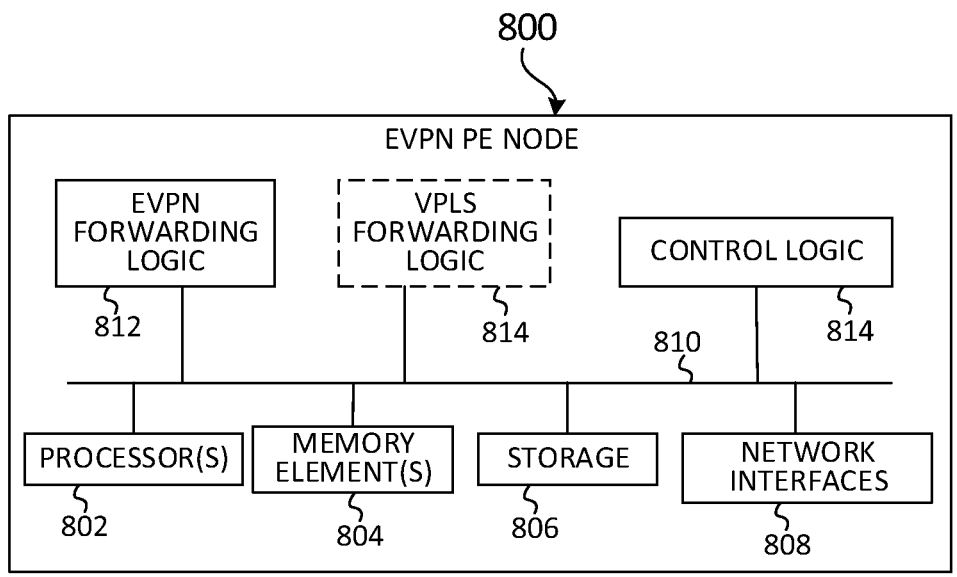
FIG. 8 is a simplified block diagram illustrating example details that can be associated with an example EVPN PE node that can be used to facilitate EVPN-VPLS interoperability for all-active multi-homed devices and networks according to one potential embodiment.

Referring to FIG. 8, FIG. 8 is a simplified block diagram illustrating example details that can be associated with an example EVPN PE node 800 that can be used to facilitate EVPN-VPLS interoperability for all-active multi-homed networks according to one potential embodiment. Example EVPN PE node 800 can be representative of any of EVPN PE node that may be deployed in an EVPN PE network configured to facilitate all-active multi-homing with a customer site (e.g., EVPN PE nodes 122.1-122.2 as shown in the embodiment FIG. 1 and EVPN PE nodes 722.1-722.2 as shown in the embodiment of FIG. 7).

In at least one embodiment, example EVPN PE node 800 can include one or more processor(s) 802, one or more memory element(s) 804, storage 806, network interfaces 808, a bus 810, EVPN forwarding logic 812 and control logic 814. In at least one embodiment, example EVPN PE node 800 can also include VPLS forwarding logic 816 (e.g., for embodiments such as shown in FIG. 1 for which EVPN PE nodes 122.1-122.2 are capable of performing both EVPN network operations and VPLS network operations). In various embodiments, instructions associated with any logic, controllers, etc. provisioned for example EVPN PE node 800 can overlap and/or be stored in any manner and are not limited to the specific allocation of instructions and/or operations described herein.

In at least one embodiment, processor(s) 802 is/are at least one hardware processor configured to execute various tasks, operations and/or functions for example EVPN PE node 800 as discussed for various embodiments described herein according to software and/or instructions configured for example EVPN PE node. In at least one embodiment, memory element(s) 804 and/or storage 806 is/are configured to store data, information, software, and/or instructions associated with example EVPN PE node, and/or logic configured for memory element(s) 804 and/or storage 806 (e.g., any logic, engines, etc. can, in various embodiments, be stored using any combination of memory element(s) 804 and/or storage 806).

In at least one embodiment, one or more data structures can be provisioned for example EVPN PE node 800 that can be used by example EVPN PE node 800 during operation to store primary pseudo wire labels and primary pseudowire replication lists (e.g., for attachment circuits for which example EVPN PE node 800 has determined to be the DF) and mirrored pseudowire labels and mirrored pseudowire replication lists (e.g., for attachment circuits for which example EVPN PE node 800 has determined to be the non-DF). In at least one embodiment, one or more data structures can be provisioned for example EVPN PE node 800 that can be used by example EVPN PE node 800 during operation to store MAC address information for MAC addresses learned via a pseudowire connection with a given VPLS PE node and/or advertised by another EVPN PE node. Other data structures can be provisioned for example EVPN PE node 800 in accordance with various embodiments described herein. Note that in some embodiments, storage can be consolidated with memory elements (or vice versa), or can overlap/exist in any other suitable manner.

In at least one embodiment, bus 810 can be configured as an interface that enables one or more elements of example EVPN PE node 800 to communicate in order to exchange information and/or data. In at least one embodiment, bus 810 may be implemented as a fast kernel-hosted interconnect, potentially using shared memory between processes (e.g., logic, etc.), which can enable efficient communication paths between the processes.

In various embodiments, network interfaces 808 enable communication between example EVPN PE node 800, and other network elements, systems, etc. that may be present in communication system 100 to facilitate operations discussed for various embodiments described herein. In some embodiments, network interfaces 808 can include one or more Ethernet driver(s) and/or controller(s), Fibre Channel driver(s) and/or controller(s), or other similar network interface driver(s) and/or controller(s) to enable communications for example EVPN PE node 800 within communication system 100.

In various embodiments, EVPN forwarding logic 812 can include instructions that, when executed (e.g., by one or more processor(s) 802), can cause example EVPN PE node 800 to perform various operations including but not limited to: performing EVPN control-plane and data-plane operations as discussed for various embodiments described herein; cooperating, maintaining, and/or otherwise interacting with logic; data structures; stored data, information, parameters, etc. (e.g., memory element(s), storage, data structures, databases, tables, etc.) of example EVPN PE node 800; combinations thereof; and/or the like to facilitate various operations as discussed for various embodiments described herein.

In various embodiments, VPLS forwarding logic 816 can include instructions that, when executed (e.g., by one or more processor(s) 802), can cause example EVPN PE node 800 to perform various operations including but not limited to: performing VPLS control-plane operations as discussed for various embodiments described herein; cooperating, maintaining, and/or otherwise interacting with logic; data structures; stored data, information, parameters, etc. (e.g., memory element(s), storage, data structures, databases, lists, tables, etc.) of example EVPN PE node 800; combinations thereof; and/or the like to facilitate various operations as discussed for various embodiments described herein.

In various embodiments, control logic 814 can include instructions that, when executed (e.g., by one or more processor(s) 802), can cause example EVPN PE node 800 to perform operations, which can include, but not be limited to: providing overall control operations of example EVPN PE node 800; cooperating with EVPN forwarding logic 812 to perform various operations; cooperating with VPLS forwarding logic (if provisioned) to perform various operations; cooperating, maintaining, and/or otherwise interacting with logic, data structures, stored data, information, parameters, etc. (e.g., memory element(s), storage, data structures, databases, lists, tables, etc.) of example EVPN PE node 800 to perform various operations; combinations thereof; and/or the like to facilitate various operations as discussed for various embodiments described herein.

Variations and Implementations

As discussed herein in this Specification, a frame or packet is a formatted unit of information that can contain control information (e.g., source and destination address, etc.) with or without data, which is also known as payload. In some embodiments, control information can be included in headers and trailers for packets or frames.

For communication system 100 and/or communication system 700, network traffic, which could include packets, frames, signals, cells, datagrams, protocol data units (PDUs), data, etc., can be sent and received according to any suitable communication messaging protocols. Suitable communication protocols can include a multi-layered scheme such as the Open Systems Interconnection (OSI) Model, or any derivations or variants thereof. The terms 'data', 'information', and 'parameters' as used herein can refer to any type of binary, numeric, voice, video, textual or script data or information, or any type of source or object code, or any other suitable data or information in any appropriate format that can be communicated from one point to another in electronic devices and/or networks.

In various embodiments, communication system 100 and/or communication system 700 may implement user datagram protocol/Internet Protocol (UDP/IP) connections and/or transmission control protocol/IP (TCP/IP) communication language protocol in particular embodiments of the present disclosure. However, communication system 100 and/or communication system 700 can alternatively implement any other suitable communication protocol, interface and/or standard, proprietary and/or non-proprietary, for transmitting and receiving messaging and/or signaling. Other protocols, interfaces and/or communication standards that can be used in communication system 100 and/or communication system 700 can include a Terminal Access controller access-control system (TACACS), TACACS+, Proxy Mobile IPv6 (PMIPv6), PMIPv4, Extensible Messaging and Presence Protocol (XMPP), MPLS protocol, General Packet Radio Service (GPRS) Tunneling Protocol (GTP) (version 1 or version 2), Generic Route Encapsulation (GRE), Ethernet over GRE (EoGRE), Extensible Messaging and Presence Protocol (XMPP), Simple Object Access Protocol (SOAP), SOAP over Hypertext Transfer Protocol (HTTP), Representational State Transfer (REST), combinations thereof, or the like. In some embodiments, secure communications can be facilitated using TCP/IP Secure Sockets Layer (SSL) communications.

Communication system 100 and/or communication system 700 can include one or more networks (e.g., customer sites 150.1-150.2, VPLS network 110, and EVPN network 120 as illustrated for the embodiment of FIG. 1), which can represent a series of points or nodes of interconnected communication paths for receiving and transmitting messages (e.g., packets of information) that propagate through the one or more networks. These nodes offer communicative interfaces that facilitate communications between the nodes. A network can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), Low Power Network (LPN), Low Power Wide Area Network (LPWAN), Machine to Machine (M2M) network, IoT network, any other appropriate architecture or system that facilitates communications in a network environment, combinations thereof, or any suitable combination thereof.

Networks through which communications propagate in communication system 100 can use any suitable technologies for communication including wireless (e.g., 3G/4G/5G/nG, IEEE 802.11 (e.g., Wi-Fi), IEEE 802.16 (e.g., Worldwide Interoperability for Microwave Access (WiMAX)), Radio-frequency Identification (RFID), Near Field Communication (NFC), Bluetooth™, mm.wave, etc.), and/or wired (e.g., T1 lines, T3 lines, digital subscriber lines (DSL), Ethernet, Fibre Channel, etc.) communication. Generally, any suitable means of communication may be used such as electric, sound, light, infrared, and/or radio.

In regards to the internal structure associated with communication system 100 and/or communication system 700, EVPN PE nodes (e.g., EVPN PE nodes 122.1-122.2 as shown for the embodiment of FIG. 1, EVPN PE nodes 722.1-722.2 as shown for the embodiment of FIG. 7, and example EVPN PE node 800), VPLS PE nodes (e.g., VPLS PE nodes 112.1-112.3 as shown for the embodiment of FIG. 1 and VPLS PE node 712 as shown for the embodiment of FIG. 7), and route reflector(s), if implemented (e.g., route reflector 724 as shown for the embodiment of FIG. 7) can include software (or reciprocating software), hardware, and/or algorithms and/or any suitable combination of components, processors, memory, storage, modules, logic, interfaces, objects, and/or the like that can facilitate the operations thereof in order to achieve operations associated with providing EVPN-VPLS interoperability in all-active multi-homed devices and networks as discussed herein for various embodiments described herein. This may be inclusive of appropriate algorithms, communication protocols, interfaces, and/or standards, proprietary and/or non-proprietary, that allow for the effective exchange of data or information in a network environment.

In various example implementations, EVPN PE nodes (e.g., EVPN PE nodes 122.1-122.2 as shown for the embodiment of FIG. 1, EVPN PE nodes 722.1-722.2 as shown for the embodiment of FIG. 7, and example EVPN PE node 800), VPLS PE nodes (e.g., VPLS PE nodes 112.1-112.3 as shown for the embodiment of FIG. 1 and VPLS PE node 712 as shown for the embodiment of FIG. 7), route reflector(s), if implemented (e.g., route reflector 724 as shown for the embodiment of FIG. 7), and CE devices (e.g., CE devices 152.1-152.6 as shown for the embodiment of FIG. 1 and CE devices 752.1-752.2 as shown for the embodiment of FIG. 7) discussed for various embodiments described herein can encompass network elements such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various EVPN-VPLS interoperability operations for all-active multi-homed devices and networks (e.g., for devices and networks such as those illustrated in FIGS. 1 and 7) as discussed for various embodiments described herein.

In various embodiments, EVPN PE nodes (e.g., EVPN PE nodes 122.1-122.2 as shown for the embodiment of FIG. 1, EVPN PE nodes 722.1-722.2 as shown for the embodiment of FIG. 7, and example EVPN PE node 800), VPLS PE nodes (e.g., VPLS PE nodes 112.1-112.3 as shown for the embodiment of FIG. 1 and VPLS PE node 712 as shown for the embodiment of FIG. 7), route reflector(s), if implemented (e.g., route reflector 724 as shown for the embodiment of FIG. 7), and CE devices (e.g., CE devices 152.1-152.6 as shown for the embodiment of FIG. 1 and CE devices 752.1-752.2 as shown for the embodiment of FIG. 7) as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'.

Information being tracked or sent to EVPN PE nodes (e.g., EVPN PE nodes 122.1-122.2 as shown for the embodiment of FIG. 1, EVPN PE nodes 722.1-722.2 as shown for the embodiment of FIG. 7, and example EVPN PE node 800), VPLS PE nodes (e.g., VPLS PE nodes 112.1-112.3 as shown for the embodiment of FIG. 1 and VPLS PE node 712 as shown for the embodiment of FIG. 7), route reflector(s), if implemented (e.g., route reflector 724 as shown for the embodiment of FIG. 7), and CE devices (e.g., CE devices 152.1-152.6 as shown for the embodiment of FIG. 1 and CE devices 752.1-752.2 as shown for the embodiment of FIG. 7) discussed herein could be provided in any database, table, register, control list, cache, storage and/or storage structure: all of which can be referenced at any suitable timeframe. Any such storage options may also be included within the broad term 'memory element' as used herein. Any of potential processing elements, controllers, systems, managers, logic, and/or machines described herein can be construed as being encompassed within the broad term 'processor'.

In various embodiments, EVPN PE nodes (e.g., EVPN PE nodes 122.1-122.2 as shown for the embodiment of FIG. 1, EVPN PE nodes 722.1-722.2 as shown for the embodiment of FIG. 7, and example EVPN PE node 800), VPLS PE nodes (e.g., VPLS PE nodes 112.1-112.3 as shown for the embodiment of FIG. 1 and VPLS PE node 712 as shown for the embodiment of FIG. 7), route reflector(s), if implemented (e.g., route reflector 724 as shown for the embodiment of FIG. 7), and CE devices (e.g., CE devices 152.1-152.6 as shown for the embodiment of FIG. 1 and CE devices 752.1-752.2 as shown for the embodiment of FIG. 7) discussed herein can also include suitable interfaces for receiving, transmitting, and/or otherwise communicating data or information in a network environment.

Note that in certain example implementations, operations as outlined herein to facilitate EVPN-VPLS interoperability for all-active multi-homed devices and networks may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage can store data, software, code, instructions (e.g., processor instructions), logic, parameters, combinations thereof, or the like used for operations described herein. This includes memory elements and/or storage being able to store data, software, code, instructions (e.g., processor instructions), logic, parameters, combinations thereof, or the like that are executed to carry out operations in accordance with teachings of the present disclosure.

A processor (e.g., a hardware processor) can execute any type of instructions associated with data to achieve the operations detailed herein. In one example, a processor can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements described herein could be some type of a programmable processor, programmable digital logic (e.g., a field programmable gate array (FPGA), a DSP processor, an EPROM, a controller, an electrically erasable PROM (EEPROM), or an ASIC) that includes digital logic, software, code, electronic instructions, or any suitable combination thereof.

One or more advantages mentioned herein do not in any way suggest that any one of the embodiments described herein necessarily provides all the described advantages or that all the embodiments of the present disclosure necessarily provide any one of the described advantages. Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, communication system 100 and/or communication system 700. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) and/or communication system 700 (and its teachings) are readily scalable and can accommodate a large number of components, as well as more complicated/sophisticated arrangements and configurations. Accordingly, the examples provided should not limit the scope or inhibit the broad teachings of communication system 100 and/or communication system 700 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces, and/or protocols, communication system 100 and/or communication system 700 may be applicable to other exchanges or routing protocols, interfaces, and/or communications standards, proprietary and/or non-proprietary. Moreover, although communication system 100 and communication system 700 have been illustrated with reference to particular elements and operations that facilitate the communication process, these elements, and operations may be replaced by any suitable architecture or process that achieves the intended functionality of communication system 100 and communication system 700.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a frame at a Ethernet Virtual Private Network (EVPN) provider edge (PE) node via an attachment circuit link, wherein the frame is to be forwarded to a Virtual Private Local Area Network (LAN) Service (VPLS) PE node and the EVPN PE node is in an all-active multi-homed configuration with at least one other EVPN PE node for a customer edge (CE) device;
   determining that the EVPN PE node is a designated forwarder for the attachment circuit link or that the EVPN PE node is not the designated forwarder for the attachment circuit link;
   forwarding the frame from the EVPN PE node to the VPLS PE node using at least one primary pseudowire label based on determining that the EVPN PE node is the designated forwarder for the attachment circuit link; and
   forwarding the frame from the EVPN PE node to the VPLS PE node using at least one mirrored pseudowire label based on determining that the EVPN PE node is not the designated forwarder for the attachment circuit link.

2. The method of claim 1, wherein the frame is associated with at least one of:
   known unicast traffic;
   broadcast traffic;
   unknown unicast traffic; and
   multicast traffic.

3. The method of claim 1, further comprising:
   determining that the frame is associated with at least one of broadcast traffic, unknown unicast traffic, or multicast traffic;
   forwarding the frame to a plurality of VPLS PE nodes based on a primary pseudowire replication list based on determining that the EVPN PE node is the designated forwarder for the attachment circuit link; and
   forwarding the frame to a plurality of VPLS PE nodes based on a mirrored pseudowire replication list based on determining that the EVPN PE node is not the designated forwarder for the attachment circuit link.

4. The method of claim 1, further comprising:
   receiving, by the EVPN PE node, a frame via a pseudowire from a VPLS PE node;

determining whether a source Medium Access Control (MAC) address contained in the frame has been previously identified by the EVPN PE node; and advertising information associated with the source MAC address to other EVPN PE nodes that are in a multi-homed configuration with the EVPN PE Node for a customer edge (CE) device based on determining that the source MAC address contained in the frame had not been previously identified by the EVPN node.

5. The method of claim 4, wherein the information advertised by the EVPN PE node comprises:

the source MAC address received from the VPLS PE node;

a Multiprotocol Label Switching (MPLS) label associated with the VPLS PE node;

and a pseudowire label associated with the pseudowire for which the frame was received.

6. The method of claim 1, further comprising:

storing, by the EVPN PE node, a primary pseudowire label for each VPLS PE node to which the EVPN PE node is connected; and storing, by the EVPN PE node, a mirrored pseudowire label associated with each VPLS PE node for each of one or more other EVPN PE nodes that are in a multi-homed configuration with the EVPN PE node.

7. The method of claim 1, wherein the frame is an Ethernet frame.

8. One or more non-transitory tangible media encoding logic that includes instructions for execution by a processor, wherein the execution causes the processor to perform operations comprising:

receiving a frame at a Ethernet Virtual Private Network (EVPN) provider edge (PE) node via an attachment circuit link, wherein the frame is to be forwarded to a Virtual Private Local Area Network (LAN) Service (VPLS) PE node and wherein the EVPN node is in an all-active multi-homed configuration with at least one other EVPN node for a customer edge (CE) device;

determining that the EVPN PE node is a designated forwarder for the attachment circuit link or that the EVPN PE node is not the designated forwarder for the attachment circuit link;

forwarding the frame from the EVPN PE node to the VPLS PE node using at least one primary pseudowire label based on determining that the EVPN PE node is the designated forwarder for the attachment circuit link; and forwarding the frame from the EVPN PE node to the VPLS PE node using at least one mirrored pseudowire label based on determining that the EVPN PE node is not the designated forwarder for the attachment circuit link.

9. The one or more non-transitory tangible media of claim 8, wherein the frame is associated with at least one of:
known unicast traffic;
broadcast traffic;
unknown unicast traffic; and
multicast traffic.

10. The one or more non-transitory tangible media of claim 8, wherein the execution causes the processor to perform further operations, comprising:

determining that the frame is associated with at least one of broadcast traffic, unknown unicast traffic, or multicast traffic;

forwarding the frame to a plurality of VPLS PE nodes based on a primary pseudowire replication list based on determining that the EVPN PE node is the designated forwarder for the attachment circuit link; and forwarding the frame to a plurality of VPLS PE nodes based on a mirrored pseudowire replication list based on determining that the EVPN PE node is not the designated forwarder for the attachment circuit link.

11. The one or more non-transitory tangible media of claim 8, wherein the execution causes the processor to perform further operations, comprising:

receiving, by the EVPN PE node, a frame via a pseudowire from a VPLS PE node;

determining whether a source Medium Access Control (MAC) address contained in the frame has been previously identified by the EVPN PE node; and advertising information associated with the source MAC address to other EVPN PE nodes that are in a multi-homed configuration with the EVPN PE Node for a customer edge (CE) device based on determining that the source MAC address contained in the frame had not been previously identified by the EVPN node.

12. The one or more non-transitory tangible media of claim 11, wherein the information advertised by the EVPN PE node comprises:

the source MAC address received from the VPLS PE node;

a Multiprotocol Label Switching (MPLS) label associated with the VPLS PE node;

and a pseudowire label associated with the pseudowire for which the frame was received.

13. The one or more non-transitory tangible media of claim 8, wherein the execution causes the processor to perform further operations, comprising:

storing, by the EVPN PE node, a primary pseudowire label for each VPLS PE node to which the EVPN PE node is connected; and storing, by the EVPN PE node, a mirrored pseudowire label associated with each VPLS PE node for each of one or more other EVPN PE nodes that are in a multi-homed configuration with the EVPN PE node.

14. An Ethernet Virtual Private Network (EVPN) provider edge (PE) node comprising:

at least one memory element for storing data; and at least one processor for executing instructions associated with the data, wherein the executing causes the EVPN PE node to perform operations, comprising:

receiving a frame at the EVPN PE node via an attachment circuit link, wherein the frame is to be forwarded to a Virtual Private Local Area Network (LAN) Service (VPLS) PE node and the EVPN PE node is in an all-active multi-homed configuration with at least one other EVPN PE node for a customer edge (CE) device;

determining that the EVPN PE node is a designated forwarder for the attachment circuit link or that the EVPN PE node is not the designated forwarder for the attachment circuit link;

forwarding the frame from the EVPN PE node to the VPLS PE node using at least one primary pseudowire label based on determining that the EVPN PE node is the designated forwarder for the attachment circuit link; and forwarding the frame from the EVPN PE node to the VPLS PE node using at least one mirrored pseudowire label based on determining that the EVPN PE node is not the designated forwarder for the attachment circuit link.

15. The EVPN PE node of claim 14, wherein the frame is associated with at least one of:
   known unicast traffic;
   broadcast traffic;
   unknown unicast traffic; and
   multicast traffic.

16. The EVPN PE node of claim 14, wherein the executing causes the EVPN PE node to perform operations further operations, comprising:
   determining that the frame is associated with at least one of broadcast traffic, unknown unicast traffic, or multicast traffic;
   forwarding the frame to a plurality of VPLS PE nodes based on a primary pseudowire replication list based on determining that the EVPN PE node is the designated forwarder for the attachment circuit link; and
   forwarding the frame to a plurality of VPLS PE nodes based on a mirrored pseudowire replication list based on determining that the EVPN PE node is not the designated forwarder for the attachment circuit link.

17. The EVPN PE node of claim 14, wherein the executing causes the EVPN PE node to perform operations further operations, comprising:
   receiving, by the EVPN PE node, a frame via a pseudowire from a VPLS PE node;
   determining whether a source Medium Access Control (MAC) address contained in the frame has been previously identified by the EVPN PE node; and
   advertising information associated with the source MAC address to other EVPN PE nodes that are in a multi-homed configuration with the EVPN PE Node for a customer edge (CE) device based on determining that the source MAC address contained in the frame had not been previously identified by the EVPN node.

18. The EVPN PE node of claim 17, wherein the information advertised by the EVPN PE node comprises:
   the source MAC address received from the VPLS PE node;
   a Multiprotocol Label Switching (MPLS) label associated with the VPLS PE node;
   and a pseudowire label associated with the pseudowire for which the frame was received.

19. The EVPN PE node of claim 14, wherein the executing causes the EVPN PE node to perform operations further operations, comprising:
   storing, by the EVPN PE node, a primary pseudowire label for each VPLS PE node to which the EVPN PE node is connected; and
   storing, by the EVPN PE node, a mirrored pseudowire label associated with each VPLS PE node for each of one or more other EVPN PE nodes that are in a multi-homed configuration with the EVPN PE node.

20. The EVPN PE node of claim 14, wherein the frame is an Ethernet frame.

* * * * *